(12) United States Patent
Salama et al.

(10) Patent No.: US 11,072,884 B2
(45) Date of Patent: Jul. 27, 2021

(54) METHOD OF MAKING AN ANTIMICROBIAL TEXTILE

(71) Applicant: Imam Abdulrahman Bin Faisal University, Dammam (SA)

(72) Inventors: Khaled Salama, Dammam (SA); Reem Y. Al Jindan, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 16/161,943

(22) Filed: Oct. 16, 2018

(65) Prior Publication Data
US 2020/0115845 A1    Apr. 16, 2020

(51) Int. Cl.
| D06M 11/46 | (2006.01) |
| D06M 11/38 | (2006.01) |
| D06M 13/144 | (2006.01) |
| D06M 13/188 | (2006.01) |
| D06M 10/00 | (2006.01) |
| D06M 10/06 | (2006.01) |
| D06M 10/08 | (2006.01) |
| D06M 101/06 | (2006.01) |

(52) U.S. Cl.
CPC .......... *D06M 11/46* (2013.01); *D06M 10/001* (2013.01); *D06M 10/06* (2013.01); *D06M 10/08* (2013.01); *D06M 11/38* (2013.01); *D06M 13/144* (2013.01); *D06M 13/188* (2013.01); *D06M 2101/06* (2013.01)

(58) Field of Classification Search
CPC .... D06M 11/46; D06M 10/001; D06M 10/06; D06M 10/08; D06M 11/38; D06M 13/144; D06M 13/188; D06M 2101/06
See application file for complete search history.

(56) References Cited

U.S. PATENT DOCUMENTS

| 2011/0097957 A1 | 4/2011 | Gedanken et al. |
| 2018/0263751 A1* | 9/2018 | Almasoud ............... A61L 27/54 |

FOREIGN PATENT DOCUMENTS

| CN | 101700040 A | 5/2010 |
| CN | 102797145 A | 11/2012 |
| CN | 102511503 B | 7/2014 |

(Continued)

OTHER PUBLICATIONS

M. Montazer et al.; "Novel feature of nano-titanium dioxide on textiles: Auntie felt he and antibacterial wool"; Journal of Applied Polymer Science; vol. 121, issue 6; Sep. 15, 2011, pp. 3407-3413 (printed from the Internet on 19 pages).*

(Continued)

*Primary Examiner* — Dah-Wei D. Yuan
*Assistant Examiner* — Kristen A Dagenais-Englehart
(74) *Attorney, Agent, or Firm* — Oblon, McClelland, Maier & Neustadt, L.L.P.

(57) ABSTRACT

A method of making an antimicrobial textile comprising $TiO_2$ nanoparticles is described. The $TiO_2$ nanoparticles are immobilized by first treating a textile with a base, and then contacting with $TiO_2$ nanoparticles in a solution of an alcohol and acid. The textile may be subsequently irradiated with UV light prior to use. The antimicrobial textile shows high effectiveness against the growth and proliferation of microorganisms transmitted within indoor environments.

12 Claims, 13 Drawing Sheets

(56) References Cited

FOREIGN PATENT DOCUMENTS

| CN | 105803760 A | 7/2016 |
|---|---|---|
| KR | 10-1235410 | 2/2013 |
| WO | 2017/213596 A1 | 12/2017 |

OTHER PUBLICATIONS

M. Montazer et al.; "Photo induced silver on nano titanium dioxide as enhanced microbial agent for wool"; Journal of Photochemistry and Photobiology B: Biology; vol. 103 (Mar. 23, 2011); pp. 207-214.*

Answers; "What is the pH level of Tide laundry detergent?", Retrieved from answers.com on Mar. 16, 2020.*

"Detergents Ingredients A-Z-Tide" (pp. 1-3), retrieved from//tide.com/en-us/ingredients/tide-detergent-ingredients-a-to-z on Mar. 16, 2020.*

Y. Dong et al.; "Finishing of cotton fabrics with aqueous nano-titanium dioxide dispersion and the decomposition of gaseous ammonia by ultraviolet irradiation"; Journal of Applied Polymer Science; vol. 99, issue 1, pp. 286-291 (supplied copy retrieved as pp. 1-14).*

M. Montazer et al.; "Nano Titanium Dioxide on Wool Keratin as UV Absorber Stabilized by Butane Tetra Carboxylic Acid (BTC a): a Statistical Prospect"; Fibers and Polymers; vol. 11, No. 7, pp. 967-975 (2010).*

M. Montazer et al.; "Functionality of nano titanium dioxide on textiles with future aspects focus on wool"; Journal of Photochemistry and Photobiology C: Photochemistry Reviews; vol. 12, pp. 293-303; Aug. 24, 2011.*

Richard J Lewis, Sr., editor; Hawley's Condensed Chemical Dictionary, 12th edition; Van Nostrand Reinhold Company; New York; 1993 (no month); excerpt pp. 7 & 223.*

M. Montazer et al.; "Novel feature of nano-titanium dioxide on textiles: Auntie felt he and antibacterial wool"; Journal of Applied Polymer Science; vol. 121, issue 6; Sep. 15, 2011, pp. 3407-3413 (printed from the Internet on 19 pages). (Year: 2011).*

M. Montazer et al.; "Photo induced silver on nano titanium dioxide as enhanced microbial agent for wool"; Journal of Photochemistry and Photobiology B: Biology; vol. 103 (Mar. 23, 2011); pp. 207-214. (Year: 2011).*

Answers; "What is the pH level of Tide laundry detergent?", Retrieved from answers.com on Mar. 16, 2020. (Year: 2020).*

"Detergents Ingredients A-Z-Tide" (pp. 1-3), retrieved from//tide.com/en-us/ingredients/tide-detergent-ingredients-a-to-z on Mar. 16, 2020. (Year: 2020).*

Y. Dong et al.; "Finishing of cotton fabrics with aqueous nano-titanium dioxide dispersion and the decomposition of gaseous ammonia by ultraviolet irradiation"; Journal of Applied Polymer Science; vol. 99, issue 1, pp. 286-291 (supplied copy retrieved as pp. 1-14). (Year: 2005).*

M. Montazer et al.; "Nano Titanium Dioxide on Wool Keratin as UV Absorber Stabilized by Butane Tetra Carboxylic Acid (BTC a): a Statistical Prospect"; Fibers and Polymers; vol. 11, No. 7, pp. 967-975 (2010). (Year: 2010).*

M. Montazer et al.; "Functionality of nano titanium dioxide on textiles with future aspects focus on wool"; Journal of Photochemistry and Photobiology C: Photochemistry Reviews; vol. 12, pp. 293-303; Aug. 24, 2011. (Year: 2011).*

Richard J Lewis, Sr., editor; Hawley's Condensed Chemical Dictionary, 12th edition; Van Nostrand Reinhold Company; New York; 1993 (no month); excerpt pp. 7 & 223. (Year: 1993).*

William M. Morris, "Synthesis of an Antimicrobial Textile Coating", California Polytechnic State University, 2011, pp. 1-26.

Majid Montazer, et al., "Novel feature of nano-titanium dioxide on textiles: Antifelting and antibacterial wool", Journal of Applied Polymer Science, vol. 121, Issue 6, Apr. 12, 2011, Only abstract of article.

V. Parthasarathi, et al., "Synthesis and Characterization of Titanium Dioxide Nano-Particles and Their Applications to Textiles for Mirobe Resistance", Journal of Textile and Apparel, Technology and Management, vol. 6, Issue 2, 2009, pp. 1-8.

Majid Montazer, et al., "Photo induced silver on nano titanium dioxide as an enhanced antimicrobial agent for wool", Journal of Photochemistry and Photobiology B: Biology, vol. 103, Issue 3, Jun. 2, 2011, Only abstract of article.

* cited by examiner

No TiO$_2$

Heavy growth

TiO$_2$ 10 ppm

Scanty growth

TiO$_2$ 30 ppm

Low-cut growth

TiO$_2$ 50 ppm

No growth

METHOD OF MAKING AN ANTIMICROBIAL TEXTILE

BACKGROUND OF THE INVENTION

Technical Field

The present invention relates to a method of making an antimicrobial textile, which involves impregnating a textile with titanium dioxide nanoparticles.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the healthcare industry, the spread of respiratory infectious diseases is of global concern for social and economic reasons. Aerosol transmission can quickly spread bacterial and fungal infections throughout indoor environments in only short periods of time. While generally associated with sneezing, infection aerosols may also be spread from a person's skin and clothing, or may be resuspended from surfaces.

A high percentage of working staff in the healthcare industry wear masks, gowns, and lab coats as normal personal protective equipment (PPE). This PPE provides protection by forming a barrier between a person and an airborne infectious agent. However, in some cases, an airborne infectious agent may persist on the outer surface of a mask, gown, or lab coat, and may actually raise the risk of disease transmission. This becomes especially true if the same piece of PPE is taken near other patients or staff, or if it is taken home near a person's family members. While such PPE may be disinfected by a variety of methods, it is sometimes difficult or impractical for the PPE to be continually changed or disinfected throughout a workday.

The prevention of pathogenic microbial infection on cotton protective equipment such as masks, gowns, and lab coats has become important due to the ease of transmission. Therefore, interest in modifying fabric to have lasting antimicrobial properties has been a priority over the last few years, especially with the growing occurrence of MRSA (methicillin-resistant *Staphylococcus aureus*) infections in hospitals.

The antimicrobial features of titanium dioxide ($TiO_2$) nanoparticles have previously been assessed. The use of inorganic $TiO_2$ nanoparticles has advanced rapidly due to the amount of work done towards the synthesis and modification of these particles for biomedical applications.

Many heavy metals and metal oxides, either in their free state or in compounds at very low concentrations, are toxic to microbes. These inorganic materials kill bacteria through various mechanisms, such as by binding to and inactivating intracellular proteins, by generating reactive oxygen species, and by directly damaging cell membranes. In the form of nanoparticles, these metals and metal oxides have larger surface areas, which results in more interaction with bacterial cell walls, for instance, in gram-negative *Escherichia coli* and gram-positive *Staphylococcus aureus*.

In view of the forgoing, one objective of the present invention is to provide a method for forming an antimicrobial coating of $TiO_2$ on a textile which may be used as part of clothing or PPE.

BRIEF SUMMARY OF THE INVENTION

According to a first aspect, the present disclosure relates to a method of making an antimicrobial textile, which method comprises the steps of: contacting a textile with an inorganic base to produce a treated textile; rinsing the treated textile to produce a rinsed textile; contacting the rinsed textile with a solution comprising $TiO_2$ nanoparticles at a concentration of 10-100 ppm, an alcohol, and an acid to form a coated textile; and irradiating the coated textile with a UV light to form an antimicrobial textile.

In one embodiment, the method further comprises neutralizing the coated textile to a pH of 6.5-7.5 before the irradiating.

In one embodiment, the method further comprises drying the coated textile before the irradiating.

In one embodiment, the method further comprises heating the coated textile at a temperature of 27-50° C. before the irradiating.

In one embodiment, the $TiO_2$ nanoparticles have an average diameter of 5-40 nm.

In one embodiment, the $TiO_2$ nanoparticles comprise at least 90% anatase phase $TiO_2$ relative to a total weight of the $TiO_2$.

In one embodiment, the solution comprises 60-90 wt % acid and 10-40 wt % alcohol relative to a total weight of the solution.

In a further embodiment, the acid is glacial acetic acid, and the alcohol is methanol.

In one embodiment, the textile and the $TiO_2$ nanoparticles are not contacted with a binding agent, and the solution does not comprise a binding agent.

In one embodiment, the solution consists of only $TiO_2$ nanoparticles, the alcohol, and the acid.

In one embodiment, the antimicrobial textile comprises $TiO_2$ nanoparticles at a weight percentage of 0.01-2.00 wt % relative to a total weight of the antimicrobial textile.

In one embodiment, the textile comprises at least one fiber selected from the group consisting of cotton fiber, wool fiber, linen, hemp fiber, and silk fiber.

In one embodiment, the textile consists essentially of cotton fiber.

In one embodiment, the antimicrobial textile comprises fibers having a surface area in which 15-40% of the surface area is covered by $TiO_2$ nanoparticles.

In one embodiment, the antimicrobial textile has an antimicrobial activity at least 100 times greater than a textile that was treated with an essentially identical method that did not have $TiO_2$ nanoparticles, when the antimicrobial textile and the textile are contacted with similar bacteria and/or fungal cells and a growth medium.

In a further embodiment, the antimicrobial activity is at least 1,000 times greater.

In a further embodiment, the bacterial and/or fungal cells are transmittable by air or aerosol droplets.

In a further embodiment, the antimicrobial textile and the textile are contacted with similar bacteria, which are gram-positive cocci.

In a further embodiment, the antimicrobial textile and the textile are contacted with similar fungal cells, which are yeast cells.

In one embodiment, the antimicrobial textile is a component of a bandage, a cast, a gown, a lab coat, a mask, a shoe covering, a face covering, a curtain, a bedcovering, a carpeting, and/or a head covering.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
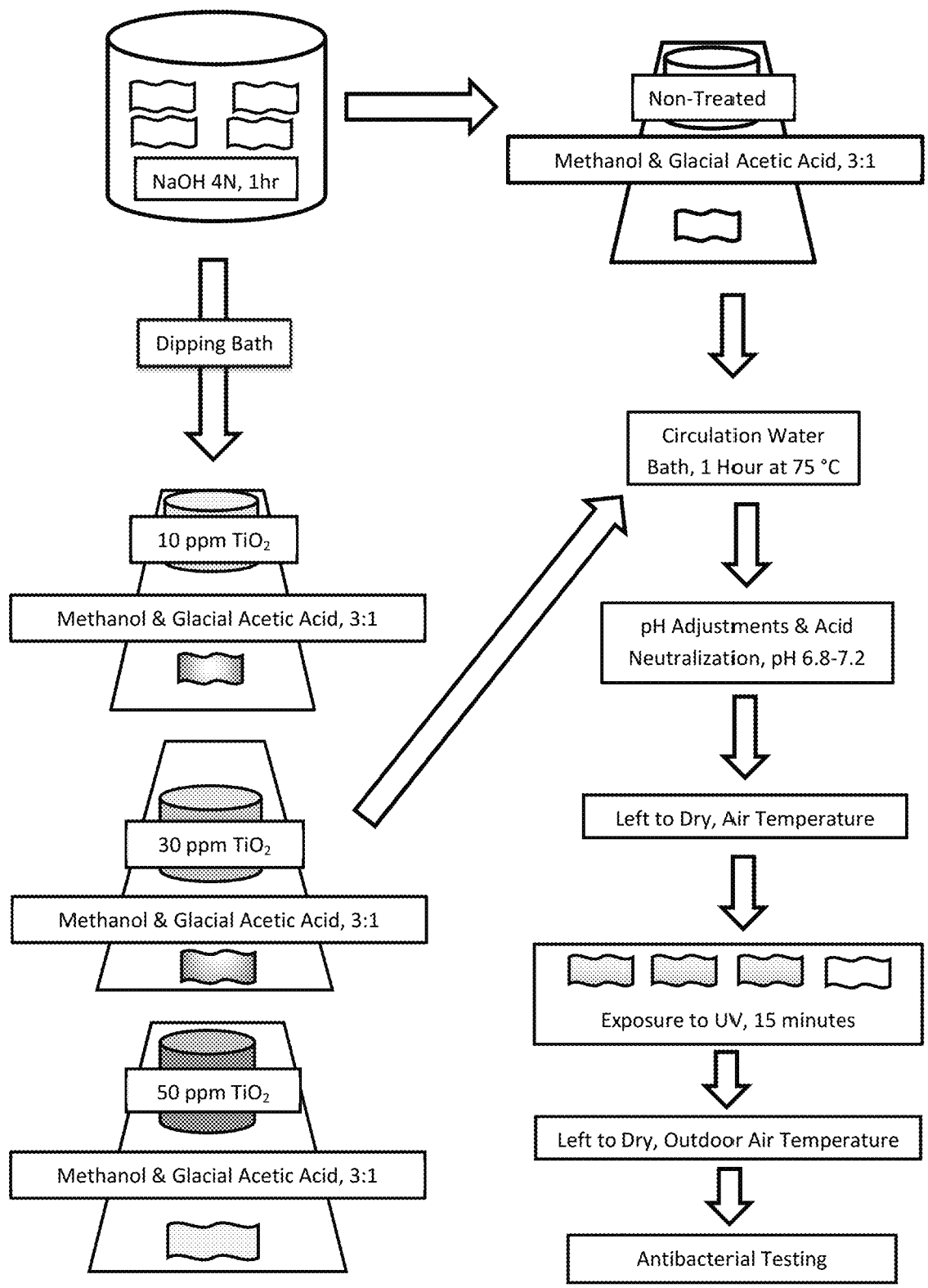
FIG. 1 is a flowchart showing an example method of making an antimicrobial textile.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of titanium include $^{44}Ti$, $^{46}Ti$, $^{47}Ti$, $^{48}Ti$, $^{49}Ti$, and $^{50}Ti$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of making an antimicrobial textile. The textile may comprise at least one fiber selected from the group consisting of cotton fiber, wool fiber, flax fiber (linen), hemp fiber, and silk fiber. In one embodiment, the textile may comprise a blend of fibers, for instance, cotton fibers may be blended with polyester fibers, nylon fibers, acrylic fibers, or wool fibers. For a textile comprising a blend of cotton and another fiber, the cotton may comprise 10-90 wt %, preferably 30-70 wt %, more preferably 40-60 wt % of the total weight of the textile. In one embodiment, the textile consists essentially of cotton fibers, meaning that the textile comprises cotton at a weight percentage of at least 95 wt %, preferably at least 98 wt %, more preferably at least 99 wt % or about 100 wt % relative to a total weight of the textile. In an alternative embodiment, the textile may consist essentially of synthetic fibers, such as nylon, polyolefins, polyesters, polyamides, polyaramids, acetates, rayon, and/or acylics. In another embodiment, the textile may comprise some other naturally derived fiber including but not limited to silk, spider silk, wood fiber, coir, bacterial cellulose, ramie, and mohair. In another embodiment, the textile may comprise an inorganic fiber such as fiberglass or boron fiber.

The textile may be formed from fibers or yarns of any size, including microdenier fibers and yarns (fibers or yarns having less than one denier per filament). Furthermore, the textile may be partially or wholly comprised of multi-component or bi-component fibers or yarns which may be splittable along their length by chemical or mechanical action. The textile may be comprised of fibers such as staple fiber, filament fiber, spun fiber, or combinations thereof.

The textile may be formed of fibers, threads, tows and yarns, of any size, including microdenier fibers and yarns (fibers or yarns having less than one denier per filament). The fibers or yarns may have deniers that range from less than about 1 denier per filament to about 2000 denier per filament or more preferably, from less than about 1 denier per filament to about 500 denier per filament, or even more preferably, from less than about 1 denier per filament to about 300 denier per filament. Preferably, the textile has accessible interstitial spaces formed by and between the surfaces of the woven and/or non-woven components. The term "woven" is intended to include any process and product whereby individual threads, fibers, fiber bundles or fiber tows are intertwined into a two or three dimensional network of a fabric or textile Thus, the term "woven" includes weaving, knitting, etc. However, textiles and fabrics may be made from non-woven methods, such as felting. As used herein, the term "fiber" refers to any of a class of materials that include continuous filaments or discrete elongated materials. Fibers can be spun into filaments, string, ropes, yarns and the like and used as a component of composite materials, or matted into sheets to make paper or felted products. The term "fiber" can be used interchangeably with the term "filament." Fibers of the present invention can be of any scale including micron and nanometer scale fibers.

In one embodiment, the textile may be woven, similar to barathea, barkcloth, batiste, bedford cord, bengaline, beta cloth, bombazine, brilliantine, broadcloth, buckram, bunting, burlap, calico, cambric, canvas, chambray, capilene, cedar bark, challis, char cloth, charmeuse, charvet, cheesecloth, chiffon, chino, chintz, cloqué, cordura, corduroy, duck, coutil, crape, crêpe, cretonne, dazzle, denim, dimity, donegal tweed, dornix, dowlas, drill, drugget, eolienne, flannel, foulard, fustian, gabardine, gauze, gazar, georgette, ghalamkar, gingham, grenadine, grenfell cloth, grosgrain, habutai, haircloth, harris tweed, herringbone, himroo, hodden, Irish linen, jamdani, kerseymere, khādī, khaki drill, kente cloth, lamé, lawn, linsey-woolsey, loden, longcloth, mackinaw, madapolam, madras, moleskin, muslin, nainsook, nankeen, ninon, oilskin, organdy, organza, osnaburg, ottoman, oxford, paduasoy, percale, pongee, poplin, rakematiz, rayadillo, rep, rinzu, ripstop, russell cord, saga nishiki, samite, sateen, satin, saye, scarlet, seersucker, sandal, serge, scrim, shot silk, stuff, taffeta, tais, toile, tucuyo, tweed twill, ultrasuede, vegetable flannel, ventile, viyella, voile, wadmal, wigan, whipcord, zephyr, zorbeez, baize chenille corduroy crimplene fustian mockado, moquette, plush, polar fleece, terrycloth, velours du kasaï, velvet, velveteen, zibeline, or some other woven style. In another embodiment, the textile may be a nonwoven, such as felt. In another embodiment, the textile may be knitted or netted. In another embodiment, the textile may be dyed or printed with any type of colorant, such as, for example, poly(oxyalkylenated) colorants, as well as pigments, dyes, tints, and the like.

The antimicrobial textile also comprises $TiO_2$ nanoparticles adsorbed and/or reacted onto the surface of the textile fibers. In one embodiment, $TiO_2$ nanoparticles adsorbed onto the surface of the textile fibers may be adsorbed by hydrogen bonding with hydroxyl groups present on the textile fibers. In this embodiment, a fabric presenting or functionalized with more hydroxyl groups may be able to adsorb more $TiO_2$ nanoparticles. Preferably the $TiO_2$ nanoparticles persist within the antimicrobial textile when subjected to rinsing, washing, or a laundry cycle. For example, preferably an antimicrobial textile subjected to a typical laundry cycle with conventional laundry detergent is able to retain at least 70 wt %, preferably at least 80 wt %, more preferably at least 90 wt % of the total $TiO_2$ nanoparticle weight right before the laundry cycle.

In one embodiment, the antimicrobial textile comprises $TiO_2$ nanoparticles at a weight percentage of 0.01-2.00 wt %, preferably 0.05-1.00 wt %, more preferably 0.1-0.8 wt %, even more preferably 0.2-0.6 wt % relative to a total weight of the antimicrobial textile. The antimicrobial textile may comprise $TiO_2$ nanoparticles at other intermediate weight percentage ranges, including but not limited to, 0.01-0.05 wt %, 0.05-0.1 wt %, 0.1-0.2 wt %, 0.2-0.3 wt %, 0.3-0.4 wt %, 0.4-0.5 wt %, 0.5-0.6 wt %, 0.6-0.7 wt %, 0.7-0.8 wt %, 0.8-0.9 wt %, and 0.9-1.0 wt %. However, in some embodiments, the antimicrobial textile may comprise $TiO_2$ nanoparticles at a weight percentage lower than 0.01 wt %, for instance, 0.0001-0.001 wt %, or 0.001-0.01 wt %, relative to a total weight of the antimicrobial textile. In other embodiments, the antimicrobial textile may comprise $TiO_2$ nanoparticles at a weight percentage greater than 2.00 wt %, for instance, 2.00-2.20 wt %, or 2.25-3.00 wt % relative to a total weight of the antimicrobial textile.

In one embodiment, the antimicrobial textile comprises fibers having a surface area in which 30-100%, preferably 35-90%, more preferably 40-80%, even more preferably 45-70 wt % of the surface area is covered by $TiO_2$ nanoparticles. However, in other embodiments, the antimicrobial textile may comprise fibers having a surface area in which less than 30% of the fiber surface area is covered, for example, 5-15%, or 15-30%. In one embodiment, the antimicrobial textile comprises fibers having a surface area in which 15-40%, preferably 20-35%, more preferably 22-33%, even more preferably 25-30 wt % of the surface area is covered by $TiO_2$ nanoparticles.

In one embodiment, the antimicrobial textile may comprise $TiO_2$ nanoparticles embedded within threads of the textile or attached to an exterior surface of a thread. In another embodiment, the antimicrobial textile may comprise $TiO_2$ nanoparticles attached to two or more threads of the textile.

In one embodiment, the $TiO_2$ nanoparticles have an average diameter of 5-40 nm, preferably 7-35 nm, more preferably 10-30 nm, even more preferably 15-26 nm, though in some embodiments, the $TiO_2$ nanoparticles may have an average diameter of less than 5 nm or greater than 40 nm.

In one embodiment, the $TiO_2$ nanoparticles are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In one embodiment, the $TiO_2$ nanoparticles are monodisperse, having a particle diameter distribution ranging from 80% of the average particle diameter to 120% of the average particle diameter, preferably 85-115%. In another embodiment, the $TiO_2$ nanoparticles are not monodisperse, for instance, they may be considered polydisperse. Here, the coefficient of variation may be greater than 25%, or greater than 37%. In one embodiment, the $TiO_2$ nanoparticles are polydisperse with a particle diameter distribution ranging from 70% of the average particle diameter to 130% of the average particle diameter, preferably ranging from 60-140%, more preferably 50-150%.

Where the antimicrobial textile comprises fibers having a surface covered by $TiO_2$ nanoparticles, the nanoparticles may be clustered or agglomerated. In one embodiment, the $TiO_2$ nanoparticles may be aggregated together in such a way so as to form clusters thereof, where at least 50 volume percent of the clusters have a mean diameter that is at least 500 nm, and preferably at least 90 volume percent of the clusters having a mean diameter that is at least 750 nm. In one embodiment, the clusters may have a mean diameter of less than 10 µm, preferably less than 5 µm, more preferably less than 2 µm. In one embodiment, the clusters may have diameters ranging from 50 nm-4 µm, or 500 nm-3 µm. In another embodiment, the clusters may have diameters ranging from 1-10 µm, or 3-7 µm.

In one embodiment, the $TiO_2$ nanoparticles consist essentially of $TiO_2$, meaning that the $TiO_2$ nanoparticles comprise at least 95 wt % $TiO_2$, preferably at least 97 wt % $TiO_2$, more preferably at least 99 wt % $TiO_2$, even more preferably at least 99.5 wt % $TiO_2$ relative to a total weight of the nanoparticles. However, in alternative embodiments, the $TiO_2$ nanoparticles may comprise less than 95 wt % $TiO_2$, and in some embodiments, the nanoparticles may be doped with other compounds, such as Pt or some other metal or metal oxide, at a weight percentage of 10-70 wt %, preferably 30-50 wt %. A $TiO_2$ nanoparticle being doped with another compound may have the other compound mixed within and/or presented on the surface, such as a core-shell structure.

$TiO_2$ exists in three crystalline phases: anatase, rutile, and brookite. Mixtures of $TiO_2$ polymorphs may have different photocatalytic activities compared to those of the pure phases, because of variations in electron-hole separation properties. In one embodiment, the $TiO_2$ of the $TiO_2$ nanoparticles may be primarily anatase, for instance, at least 70 wt %, preferably at least 80 wt %, more preferably at least 90 wt %, even more preferably at least 95 wt % or about 100 wt % of the total $TiO_2$ weight is anatase phase $TiO_2$. In one embodiment, the $TiO_2$ nanoparticles comprise at least 90% anatase phase $TiO_2$. In one embodiment, the $TiO_2$ may be multiphasic. The term "multiphasic," as used herein, refers to a compound comprising two or more types of amorphous and/or crystalline phases. Biphasic compounds and triphasic compounds may be referred to as multiphasic compounds. In embodiments where the $TiO_2$ of the $TiO_2$ nanoparticles comprises less than 100 wt % anatase phase, the other phases may be rutile, brookite, or amorphous $TiO_2$.

In one embodiment, the antimicrobial textile consists essentially of the textile and the $TiO_2$ nanoparticles, meaning that no binding agents or other compounds such as stabilizers or adhesives are present, and at least 98 wt %, preferably at least 99 wt %, more preferably at least 99.5%, even more preferably at least 99.9 wt % of the total weight of the antimicrobial textile comprises the weight of the $TiO_2$ nanoparticles and the textile.

However, in alternative embodiments, other compounds may be present on or within the textile, such as binding agents, sizing, antistatic agents, brightening compounds, nucleating agents, antioxidants, UV stabilizers, fillers, permanent press finishes, softeners, lubricants, curing accelerators, water repellent fluorocarbons and their derivatives, silicones, waxes, and the like. In one alternative embodiment, a binding agent may be used to bind the particle to the fabric. Examples of suitable binding agents include, but are not limited to casein isolate, soy protein isolate, starch, starch derivatives, gums and synthetic latexes. In one embodiment, the antimicrobial textile may further comprise silver nanoparticles, at a weight percentage of 1-50 wt %, preferably 10-40 wt %, relative to a total weight of the $TiO_2$ nanoparticles.

In another alternative embodiment, the antimicrobial textile may comprise other UV blocking particles in addition to $TiO_2$ nanoparticles. Here, the UV blocking particles may be inorganic, organic, or metallic. Examples of particles that may be used include, but are not limited to muscovite, phlogopite, biotite, sericite, fushitite, margarite, synthetic mica, metal oxide coated mica, colored pigment coated mica, talc, metal oxides, metallic hydroxides, mixed metal oxides and hydroxides, metal and mixed metal silicates and aluminosilicates, transition metal oxides and hydroxides, $ZrO_2$, $Fe_2O_3$, natural clay, metal sulfides, non-metallic elements, ionic salts and covalent salts, powdered ceramics, organic polymers, natural polymers, insoluble organic materials and biomaterials, particularly UV absorbing molecules, aluminum, copper, copper-bronze, bronze gold, silver and collagen. The UV blocking particles preferably have an aspect ratio of at least two, more preferably at least ten, and are preferably flat or scaly in shape. The UV blocking particles have a size of at least 5 nm, preferably at least 6 µm, and more preferably at least 15 µm. In one embodiment, the presence of UV blocking particles may increase the UV blocking ability of the antimicrobial fabric while decreasing the antimicrobial activity. However, preferably the presence of UV blocking particles increases both the UV blocking ability and the antimicrobial activity. UV blocking particles may be present at a weight percentage of 1-70 wt %, preferably 10-50 wt %, relative to a total weight of the $TiO_2$ nanoparticles, though in some embodiments, the total weight of the UV blocking particles of an antimicrobial textile may be greater than the total weight of the $TiO_2$ nanoparticles.

In one embodiment, the antimicrobial textile is a component of a bandage, a cast, a gown, a lab coat, a mask, a shoe covering, a face covering, a curtain, a bedcovering, a carpeting, and/or a head covering. In one embodiment, the antimicrobial textile may be a niqab. Preferably, in some embodiments, it is envisioned that the antimicrobial textile is used in places where infectious disease control is emphasized, such as in hospitals and clinics. However, the antimicrobial textile may find use in schools, vehicles, homes, museums, offices, schools, places of worship, industries, and in outdoor recreation for a variety of uses. In other embodiments, the antimicrobial textile may be a component of a table cloth, a bag such as a purse or backpack, a tent, a napkin, a bib, a glove, a steering wheel cover, pet clothing, a hammock, a cape, or a cleaning cloth. In an alternative embodiment, the antimicrobial textile may be used to filter and disinfect contaminants from water or air, with or without UV irradiation. In another alternative embodiment, the antimicrobial textile may be subjected to UV irradiation for the primary purpose of removing a stain or cleaning the antimicrobial textile.

Preferably, the antimicrobial textile has prominent antimicrobial features. As used herein, term "antimicrobial" refers to an agent or composition that can kill or otherwise inhibit the growth or proliferation of microbes including, for example, bacteria, viruses, and fungi. Similarly, the term "antimicrobial activity" as used herein refers to activity that can kill or otherwise inhibit the growth or proliferation of microbes including bacteria, yeasts, viruses and fungi.

Those skilled in the art may select methods of making the antimicrobial textile to maximize its antimicrobial activity, for example, by selecting an appropriate concentration of reagents or $TiO_2$ nanoparticles. These selections may be made based on the results of the antimicrobial assays described below. The antimicrobial activity of the antimicrobial textile may be determined using standard assays and procedures known in the art. A skilled artisan may know how to conduct an assay including the use of appropriate controls, negative and positive, to ensure that the results of the assay are meaningful.

In one embodiment, the antimicrobial textile has an antimicrobial activity of at least 100 times greater than a textile that was treated with an essentially identical method that did not have $TiO_2$ nanoparticles, when the antimicrobial textile and the textile are contacted with similar bacteria and/or fungal cells and a growth medium. Preferably, the antimicrobial activity is at least 200 times greater, more preferably at least 500 times greater, even more preferably at least 1,000 times greater, or even 10,000 times greater. In another embodiment, the antimicrobial textile may essentially kill or inhibit all microorganisms or all visible colonies that it contacts.

In one preferred embodiment, the antimicrobial textile has antimicrobial activity against organisms and viruses that may occur in healthcare settings, or may otherwise be the cause of healthcare-associated infections (HAI). These organisms and viruses include, but are not limited to, *Acinetobacter, Burkholderia cepacia, Candida auris, Clostridium difficile, Clostridium Sordellii,* Enterobacteriaceae (carbapenem-resistant), gram-negative bacteria, hepatitis A, hepatitis B, hepatitis C, human immunodeficiency virus (HIV/AIDS), influenza, *Klebsiella*, methicillin-resistant *Staphylococcus aureus* (MRSA), *Mycobacterium abscessus, Mycobacterium tuberculosis,* norovirus, *Pseudomonas aeruginosa, Staphylococcus aureus,* tuberculosis (TB), vancomycin-intermediate *Staphylococcus aureus,* vancomycin-resistant *Staphylococcus aureus,* and vancomycin-resistant enterococci (VRE).

Preferably the antimicrobial textile is additionally effective against additional viruses, bacteria, and/or fungi. Additional viruses include, but are not limited to, Ebola, rhinovirus, herpes, rabies, chicken pox, and measles. Additional bacteria include, but are not limited to, *Listeria monocytogenes, Neisseria meningitides, Vibrio cholera, Enterococcus faecalis, Clostridium botulinum, Clostridium tetani, Bacillus cereus, Salmonella enterica, Bacillus anthracis, Bacillus subtilis, Escherichia coli,* and gram-positive cocci. Additional fungi include yeasts, *Candida albicans, Cryptococcus neoformans, Cryptococcus gattii, Aspergillus fumigatus, Aspergillus flavus, Histoplasma capsulatum, Coccidioides immitis, Coccidioides posadasii, Blastomyces dermatitides, Sporothrix schenckii, Pneumocystis jirovecii. Histoplasma capsulatum, Magnaporthe oryzae, Botrytis cinerea,* species within the *Puccinia* genus, *Fusarium graminearum, Fusarium oxysporum, Fusarium equiseti, Blumeria graminis, Mycosphaerella graminicola,* species within the *Colletotrichum* genus, *Ustilago maydis, Melampsora lini, Phakopsora pachyrhizi, Rhizoctonia solani, Cochliobolus lunatus, Rhizopus oryzae,* or *Phoma sorghina.*

In one embodiment, a variation of an agar diffusion method may be used to measure antimicrobial activity. Here, a piece of an antimicrobial textile may be placed on a semi-solid (agar based) medium. In one embodiment, the medium may be blood agar. Preferably the semi-solid agar medium may be uniformly inoculated with a target microorganism prior to contacting with the textile. The antimicrobial textile may or may not be contacted with a liquid growth medium and/or microorganism culture before being placed on the semi-solid medium. After incubation with the textile intact, a zone of decreased or inhibited microorganism growth may exist underneath the textile. In one embodiment, existing microorganisms underneath the textile may cease to grow; in another embodiment, existing microorganisms underneath the textile may be killed. The textile and inoculated semi-solid medium may together be incubated for 6 h-7 days, preferably 12 h-5 days, more preferably 18 h-3 days, while at a temperature 24-42° C., preferably 32-40° C., more preferably 36-38° C. In one embodiment, after incubation, the medium in contact with the antimicrobial textile may have a microorganism surface density that is 1-80% of the microorganism surface density of similar medium in contact with a control textile, preferably 2-60%, more preferably 3-20%. However, in some embodiments, the antimicrobial textile may lead to a microorganism surface density that is lower than 1% of a microorganism surface density underneath a control textile, for instance, 0.001-0.1%, preferably 0.01-0.1%. In one embodiment, following incubation, the semisolid medium underneath the antimicrobial textile may have essentially no microorganisms, or no visible colonies of microorganisms. A control textile may be an untreated textile similar to the textile used for the antimicrobial textile. Preferably, a control textile is a textile treated in the same ways and with the same reagents as the antimicrobial textile with the exception that no $TiO_2$ nanoparticles are present at any step.

In one embodiment, the antimicrobial activity is measured after exposing the antimicrobial textile to airborne microorganisms, or to bacterial and/or fungal cells that are transmittable by air or aerosol droplets. In one embodiment, the microorganisms are yeast and/or gram-negative cocci. In one embodiment, the airborne microorganisms may come from the inside of a hospital, clinic, clean room, culture room, or laboratory, where cleanliness is important. For instance, the antimicrobial textile and a control textile may be placed in the open on a table or lab bench for about one workday. Following that, the textile samples may be placed on top of a semisolid growth medium, or smeared on a semisolid growth medium. Subsequent differences in microorganism growth may then be monitored. In one embodiment, the antimicrobial textile and control textile may be irradiated with UV light before exposing to the airborne microorganisms.

In another embodiment, the antimicrobial textile and control textile may be contacted directly with a microorganism culture in a liquid growth medium, or on an agar plate. For instance, the liquid growth medium may contain one or more microorganism species at a concentration of $10^4$-$10^6$, preferably $5.0 \times 10^4$-$5.0 \times 10^5$, cells/mL. The textiles may be soaked and incubated, or soaked and subcultured. In another embodiment, a liquid growth medium may be sprayed, poured, or dropped onto a textile, and immediately following, or after an incubation period, the differences in microorganism growth may be measured.

In another embodiment, a liquid microorganism culture may have pieces of antimicrobial or control textile added. The liquid culture may be in a flask, a culture tube, or a well plate and having a cell concentration of $10^5$-$10^8$ cells per mL growth medium, preferably $5 \times 10^6$-$5 \times 10^7$ cells per mL. After a period of incubation, such as 6 h-3 days, or 8 h-20 h, the liquid culture density may be measured, for instance, by degree of opacity.

In one embodiment, antimicrobial textile and control textile samples may be situated in an indoor environment for 4-18 hours, preferably 6-10 hours, or about 8 hours. The samples may be inoculated in a liquid broth at a ratio of 0.05-1.0 g sample textile per mL liquid broth, preferably 0.1-0.8 g/mL, more preferably 0.2-0.7 g/mL. However, in some embodiments, the samples may be inoculated at a ratio of lower than 0.05 g/mL or greater than 1.0 g/mL. In one embodiment, the textile samples may be cut into smaller pieces with a sterile blade before inoculating. The inoculated samples may be incubated for 8-48 h, preferably 18-36 h, or about 24 h at a temperature of 24-42° C., preferably 32-40° C., more preferably 36-38° C., with or without shaking. In one embodiment, the liquid growth medium may be a cooked meat broth, though other liquid growth media may be used, such as LB broth. Following the incubation of the textile samples, the liquid growth medium may be subcultured on a semi-solid growth medium. In one embodiment, the liquid growth medium may be concentrated or diluted before the subculturing, though in another embodiment, the liquid growth medium may be spread on the semi-solid growth medium without concentrating or diluting. In one embodiment the semi-solid growth medium may be an agar medium, preferably blood agar. Then the semi-solid growth medium may be incubated at a temperature of 24-42° C., preferably 32-40° C., more preferably 36-38° C., for a period of 18 h-3 days, preferably 24 h-2.5 days, or about 48 h. Following this incubation, the amount of microorganism growth may be visually distinguishable between the control sample and the antimicrobial sample, as shown in FIGS. 2A-2D. In one embodiment, antimicrobial textiles treated with higher concentrations of $TiO_2$ nanoparticles produce lower amounts of microorganism growth.

Preferably the antimicrobial sample produces at least 100 times less microorganism growth, preferably at least 1,000 times less microorganism growth than the control sample. In other words, the antimicrobial textile has an antimicrobial activity of at least 100 times higher, preferably at least 1,000 times higher than the control sample.

The present disclosure also relates to a method of making the antimicrobial textile. This method comprises the steps of: contacting a textile with an inorganic base to produce a treated textile; rinsing the treated textile to produce a rinsed textile; contacting the rinsed textile with a solution comprising $TiO_2$ nanoparticles at a concentration of 10-100 ppm, an alcohol, and an acid to form a coated textile; and irradiating the coated textile with a UV light to form an antimicrobial textile. An example method is shown in FIG. 1.

The textile may be any of those previously mentioned. In one embodiment, the textile may be washed, laundered, or cleaned before contacting with an inorganic base. In a preferred embodiment, the textile may be cleaned with a commercial laundry detergent at 50-100° C., preferably 90-100° C., for 10-60 minutes, preferably 15-30 minutes. The textile may be thoroughly rinsed with water to remove the detergent. In one embodiment, the textile comprises cotton fibers.

In the method, water used for rinsing or for making aqueous solutions may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 μS·cm$^{-1}$, preferably less than 1 μS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 μg/L, preferably less than 200 μg/L, more preferably less than 50 μg/L.

In one embodiment, the inorganic base may be dropped, sprayed, or poured on the textile. In another embodiment, the textile may be dropped, dipped, or submerged in the inorganic base. The textile weight may be 10-80 wt %, or 20-70 wt % of the total weight of the textile and inorganic base. The inorganic base may comprise alkali metal or alkaline earth metal compounds such as sodium hydroxide, lithium hydroxide, potassium hydroxide, sodium carbonate, potassium carbonate, sodium bicarbonate, potassium bicarbonate, magnesium carbonate, sodium hypochlorite, and calcium carbonate. Other suitable bases include ammonium hydroxide, substituted amine bases, and ammonia, and in alternative embodiments, an organic base may be used. Preferably the inorganic base is sodium hydroxide. The concentration of the base may be 0.5-5 M, preferably 1-4.5 M, or about 4 M or 4 N. However, in some embodiments, the concentration may be lower than 0.5 M or greater than 5 M. The textile may be kept in contact with the inorganic base for 10-60 minutes, preferably 20-45 minutes, more preferably 25-35 minutes, with or without agitation. In other embodiments, the textile may be kept in contact with the inorganic base for less than 10 minutes or longer than 60 minutes. The inorganic base may have a temperature of 20-80° C. or 22-40° C. The contacting with the inorganic base produces a treated textile, which may also be considered a mercerized textile.

In alternative embodiments, the textile may be subjected to different finishing processes, such as desizing, scouring, bleaching, mercerizing, singeing, raising, calendaring, sanforizing, dyeing, and/or printing.

Following contacting with the inorganic base, the treated textile may be rinsed with water to remove the inorganic base and produce a rinsed textile. Preferably the treated textile may be rinsed with water to remove the inorganic base until producing rinse water with a neutral pH, or a pH of 6.5-7.5 or about 7.0. In one embodiment, a treated textile may be contacted with an acid to neutralize the base. In one embodiment, the water used for rinsing has a temperature of 30-40° C., though in some embodiments, hotter or colder water may be used for rinsing. The treated textile may be rinsed, or soaked in one or more water baths, for a total of 15-60 min, preferably 25-40 min.

The rinsed textile may then be contacted with a solution comprising $TiO_2$ nanoparticles at a concentration of 10-100 ppm, preferably 20-80 ppm, more preferably 25-60 ppm. This step produces a coated textile. However, in some embodiments, the solution may comprise the $TiO_2$ nanoparticles at a concentration of greater than 100 ppm, for instance, 200-300 ppm, or 400-600 ppm or greater. The $TiO_2$ nanoparticles may be similar to those mentioned previously for the antimicrobial textile. Preferably the liquid phase of the solution comprises an alcohol and an acid. In another embodiment, the liquid phase consists of only an alcohol and an acid. In one embodiment, the solution consists of only $TiO_2$ nanoparticles, the alcohol, and the acid. In one embodiment, a volume ratio of the alcohol to the acid is 1:1-10:1, preferably 2:1-5:1, more preferably 2.5:1-3.5:1, or about 3:1. However, in some embodiments, the volume ratio may be smaller than 1:1 or greater than 10:1. In one embodiment, the solution comprises 60-90 wt % acid, preferably 70-80 wt % acid and 10-40 wt % alcohol, preferably 20-30 wt % alcohol, relative to a total weight of the solution.

The alcohol may be methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol,3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol, and/or some other alcohol. In a preferred embodiment, the alcohol is ethanol or methanol, more preferably methanol.

The acid may be an inorganic acid such as hydrochloric acid, bromic acid, sulfuric acid, nitric acid, iodic acid, hydrofluoric acid, sulfuric acid, or some other inorganic acid. In another embodiment, the acid may be an organic acid, such as glacial acetic acid, fumaric acid, formic acid, propionic acid, benzoic acid, butyric acid, citric acid, malic acid, adipic acid, tannic acid, lactic acid, ascorbic acid, or some other acid. Preferably the acid is glacial acetic acid, and may be concentrated glacial acetic acid. In one embodiment, the acid is glacial acetic acid, and the alcohol is methanol. In one embodiment, the solution consists of only $TiO_2$ nanoparticles, methanol, and glacial acetic acid. In one embodiment, a binding agent is not used in the solution and a binding agent is not contacted with the $TiO_2$ nanoparticles or with the textile.

The textile may be submerged or contacted with the solution comprising $TiO_2$ for a period of 15 min-24 h, preferably 30 min-2 h, more preferably 40-90 min, though in some embodiments, the textile may be submerged or contacted for longer than 24 h. The solution and textile may be maintained at a temperature of 20-100° C., preferably 30-90° C., more preferably 50-80° C., or about 75° C. In alternative embodiments, the solution may be applied to the textile by spraying, dripping, rolling, painting, spin coating, printing, pressing, or some other technique.

The coated textile may then be neutralized to a pH of 6.5-7.5, preferably 6.8-7.2 by rinsing with water as previously described, or by adding drops of a base or acid. In one embodiment, drops of nitric acid may be used to neutralize the textile. However, in another embodiment, the coated textile is not neutralized, and in a further embodiment, the coated textile is not rinsed.

In one embodiment, the coated textile is dried and/or heated. The coated textile may be dried with or without heating for 1-48 h, preferably 2-36 h, more preferably 6-24 h. Where the coated textile is heated, it may be heated at a temperature of 27-50° C., preferably 32-40° C. In one embodiment, the coated textile may be dried and heated by leaving in a warm, outdoor environment, with or without direct sunlight. In other embodiments, the textile may be dried by placing in a desiccator, a vacuum desiccator, or an oven.

The method then comprises the step of irradiating the coated textile with a UV light to form an antimicrobial textile. However, in some embodiments, the coated textile may demonstrate antimicrobial activity without being irradiated. As defined herein, ultraviolet (UV) light refers to electromagnetic radiation comprising one or more wavelengths within the range 1 nm-400 nm. The irradiation source may be a flame, a lantern, a gas discharge lamp, an incandescent bulb, a laser, a fluorescent lamp, an electric arc, a light emitting diode (LED), a cathode ray tube, sunlight, and/or some other source of light. Preferably the irradiation source may be a gas discharge lamp comprising xenon and/or mercury vapor. Preferably the irradiation source may have a total power output of 50-1000 W, preferably 100-750 W, more preferably 250-600 W, and may be positioned 5-30 cm, preferably 7-20 cm, more preferably 8-15 cm from the closest surface of the textile. The coated textile may be irradiated for 5-60 min, preferably 10-30 min, or about 15 min. In one embodiment, the irradiating may be performed under a laminar flow. In one embodiment, the $TiO_2$ nanoparticles are not fixed to the textile by a binding agent, a fixative, a coating, an adhesive, or some other similar substance. In one embodiment, instead of treating the coated textile with a UV light, or in addition to treating with UV light, the coated textile may be irradiated with microwave or infrared radiation.

In one embodiment, the $TiO_2$ nanoparticles of the coated textile and/or the antimicrobial textile may have surfaces functionalized with carboxyl groups or other molecules, organic or inorganic, due to contact with the acid and/or alcohol. In one embodiment, the $TiO_2$ nanoparticles may comprise 0.0001-1.0 wt %, preferably 0.001-0.5 wt %, more preferably 0.005-0.1 wt %, even more preferably 0.01-0.09 wt % carboxyl groups relative to a total weight of the $TiO_2$ nanoparticles. However, in some embodiments, the $TiO_2$ nanoparticles may comprise less than 0.0001 wt % or greater than 1.0 wt % carboxylic acid groups. In another embodiment, the $TiO_2$ nanoparticles may comprise other organic molecules functionalized or adsorbed to the surface. In one embodiment, the $TiO_2$ nanoparticles may comprise other organic molecules functionalized or adsorbed at a weight percentage that is decreased following the UV treatment.

In one embodiment, the textile being contacted with the inorganic base, or with the subsequent contacting with the solution comprising the $TiO_2$ nanoparticles, the alcohol, and the acid, may experience a reduction in internal hydrogen bond content. For instance, the number of internal hydrogen bonds in the textile may be reduced by 10-90%, preferably 20-80%, more preferably 30-70% relative to a total number of internal hydrogen bonds present in the textile before the contacting with the inorganic base or with the $TiO_2$ nanoparticle solution. However, in some embodiments, the number of internal hydrogen bonds may be reduced by less than 10% or reduced by greater than 90%. In one embodiment, the change in the number of internal hydrogen bonds may be measured by NMR, FTIR, or by some other type of spectroscopy. In an alternative embodiment, the textile being contacted with the inorganic base or with the solution comprising $TiO_2$ nanoparticles may experience an increase in internal hydrogen bond content, for instance, the number of internal hydrogen bonds may increase by 20-100%, preferably 40-80% relative to the number of internal hydrogen bonds before the contacting. However, in some embodiments, the number of internal hydrogen bonds may increase by less than 20% or by greater than 100%. In another embodiment, the number of internal hydrogen bonds may be substantially unchanged.

In one embodiment, the $TiO_2$ nanoparticles may be synthesized by a sol-gel process. A sol-gel process is a versatile solution process for making ceramic materials, including metal oxides. In general, the sol-gel process involves the transition of a system from a liquid "sol" (mostly colloidal) into a solid "gel" phase. Applying the sol-gel process, it is possible to fabricate metal oxide materials in a wide variety of forms: ultra-fine or spherically-shaped powders, thin film coatings, fibers, microporous inorganic membranes, monolithic ceramics and glasses, or extremely porous aerogel materials. The starting materials used in the preparation of the "sol" are usually inorganic metal salts or metal organic compounds such as metal alkoxides. For instance, for TiO₂ nanoparticles, titanium isopropoxide or some other titanium alkoxide may be used. In a typical sol-gel process, the precursor is subjected to a series of hydrolysis and polymerization reactions to form a colloidal suspension, or a "sol". In one embodiment, this may involve contacting the precursor with an acid and/or an alcohol, for instance, glacial acetic acid and methanol. Further processing of the "sol" enables one to make TiO₂ different forms. Thin films or coatings of TiO₂ particles may be produced on a piece of substrate by spin-coating or dip-coating. When the "sol" is cast into a mold, a wet "gel" may form. With further drying and heat-treatment, the "gel" is converted into dense TiO₂ particles. If the liquid in a wet "gel" is removed under a supercritical condition, a highly porous and extremely low density material called "aerogel" may be obtained. As the viscosity of a "sol" is adjusted into a proper viscosity range, TiO₂ fibers may be drawn from the "sol." Ultra-fine and uniform TiO₂ powders may also be formed by precipitation, spray pyrolysis, or emulsion techniques. In one embodiment, a textile is brought into contact with reagents being subjected to a sol-gel process so that TiO₂ nanoparticles may form embedded in or deposited on the textile. In another embodiment, a sol-gel process may be used to form the TiO₂ nanoparticles, which are then applied to a treated textile while in a mixture of alcohol and acid as previously described. In another embodiment, a gel of TiO₂ nanoparticles may be contacted directly with a treated or untreated textile. In another embodiment, a gel of TiO₂ nanoparticles on a textile may be dried as a method of depositing the TiO₂ nanoparticles.

In an alternative embodiment, the TiO₂ may be deposited on a textile by electron beam deposition, chemical vapor deposition, wet deposition, or some other technique. In another alternative embodiment, the TiO₂ nanoparticles may be sputtered on the textile, for instance, by a RF sputtering mode, a magnetron sputtering mode, or a DC sputtering mode.

In another embodiment, TiO₂ nanoparticles may be produced by sonicating a titanium precursor solution with a textile, which sonicating may be considered a sonochemical technique. For instance, titanium acetate may be mixed with an aqueous alcohol solution. A textile may be immersed in the solution, and then adjusted to a basic pH and then purged of $CO_2$ and air. The solution and textile may then be subjected to a high intensity ultrasonic energy (for instance, about 20 kHz and 1-2 kW for about 1 hour). The textile may then be washed and dried to produce an antimicrobial textile comprising deposited TiO₂ nanoparticles.

In an alternative embodiment, TiO₂ nanoparticles may be deposited or added onto one or more threads of a textile before being weaved or knitted into a textile.

The examples below are intended to further illustrate protocols for preparing the antimicrobial textile and are not intended to limit the scope of the claims.

EXAMPLE 1

Materials

Nanoparticles of TiO₂ (TiO₂ NP) tend to have a high affinity towards organic acids, hydroxyl groups, and alcohols; therefore, introducing higher amounts of these stabilizing and fixative chemicals as an organic matrix within a fabric can lead to a higher adsorption rate of TiO₂ on the surface of cotton fabric in comparison with non TiO₂ treated samples.

Nano powder of titanium dioxide (TiO₂) was used, having an average particle size around <21 nm. Among other qualities, Nano TiO₂ has two prominent properties being its large surface area and mainly anatase phase structure.

This method is based on the preparation of different concentrations of colloidal TiO₂ suspensions, which are subjected to hydrolysis in an acid and alcohol medium, and are converted into corresponding hydroxides that are unstable and susceptible to further condensation processes. By a simple dipping process, nanoparticles can be easily coated on a fabric surface. The small diameter of anatase TiO₂ results in a high surface area of the particles and hence an improved photocatalytic activity.

EXAMPLE 2

Coating Mechanism

The good adhesion mechanism between TiO₂ nanoparticles and the selected cotton fabric is due to the internal hydroxyl (—OH) group presented in the chemical formula of the cotton and in an acid alcohol medium (dipping bath). Thus, TiO₂ nanoparticles may easily bind to hydroxyl groups through hydrogen bonding. The cotton was fully coated with TiO₂ NPs, which formed a covering around the cotton fibril as compared with the untreated cotton, which has a smooth surface with no particles. The TiO₂ nanoparticles used here have a narrow size distribution, and the density of particles per unit area for the coated fabric was very high. The nanoparticles work as a cover (coating layer) around the cotton fabric.

The TiO₂ nanoparticle coated cotton showed higher photocatalytic and antimicrobial activity than the uncoated cotton after the UV lamp exposure. The irradiation of TiO₂ nanoparticles with photons of energy equal or greater than its band-gap (3.2 eV) results in the transition of electrons from the valence band (VB) to the conduction band (CB). This transition causes regions of positively-charged electron holes (h+) and free electrons (e⁻). At the TiO₂ nanoparticle surface, the holes reacted with surface hydroxyl groups (—OH) or adsorbed $H_2O$ molecules to form OH. radicals that have extreme and efficient antibacterial effects.

The antimicrobial properties of nanomaterials, including metal nanoparticles, can be attributed to different mechanisms such as the generation of reactive oxygen species, inactivation of cellular enzymes and nucleic acids of the microbes, and pore formation in the bacterial cell wall.

Among metal nanoparticles, TiO₂ NPs are known to be cost effective, stable, and safe for humans and the environment. A unique characteristic of TiO₂ NPs is their photocatalytic property, which results in enhanced antibacterial activity upon exposure to light in the UV range. TiO₂ NPs exist in three crystalline phases, and of those, the anatase phase demonstrates high photocatalytic and antimicrobial properties. TiO₂ nanoparticles have been reported to have the ability to be photo-activated which induces antimicrobial activity once coated on cotton fabric.

Figure 3A:
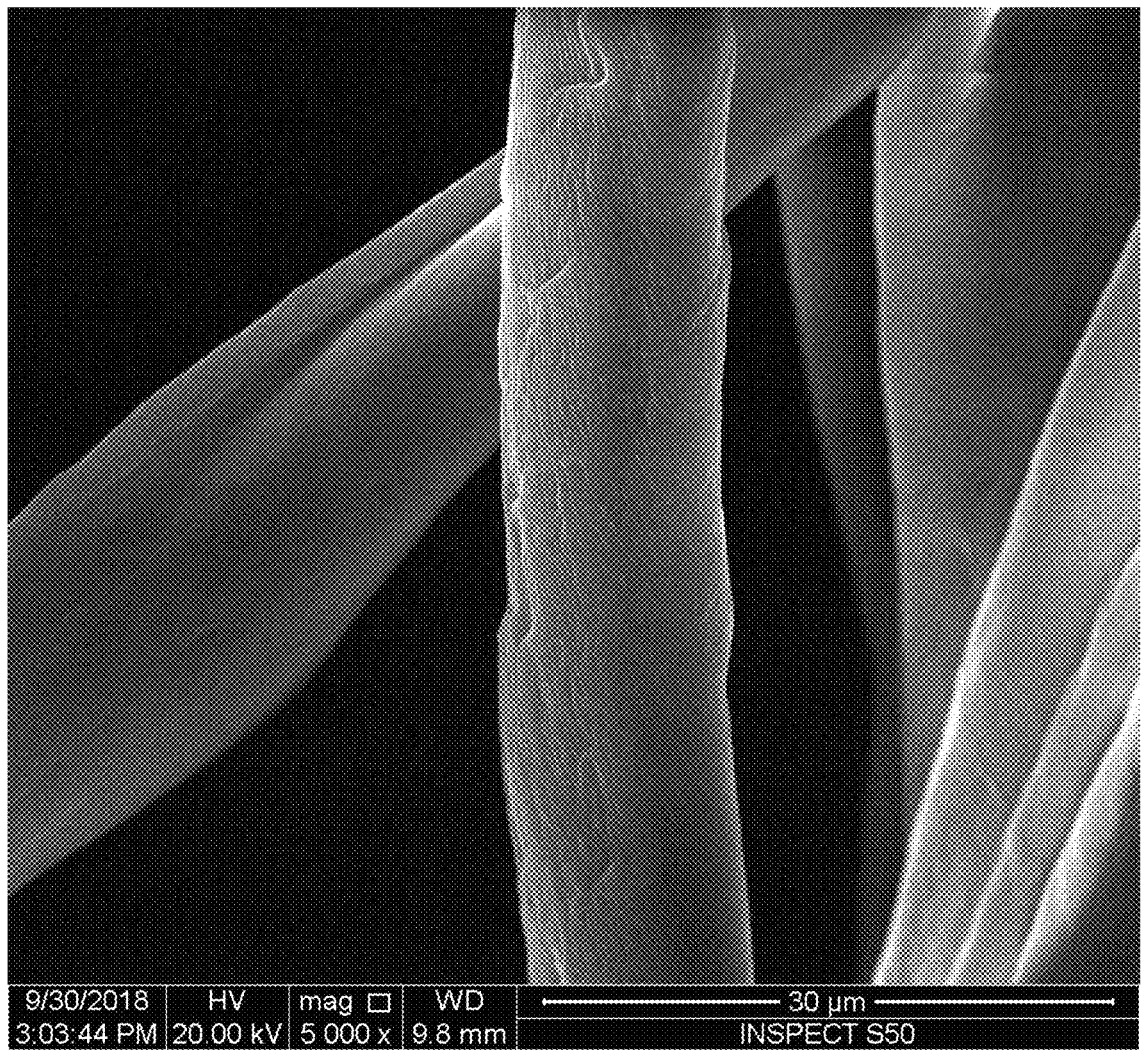
FIG. 3A shows a scanning electron microscope (SEM) image of an untreated cotton textile.
Figure 3B:
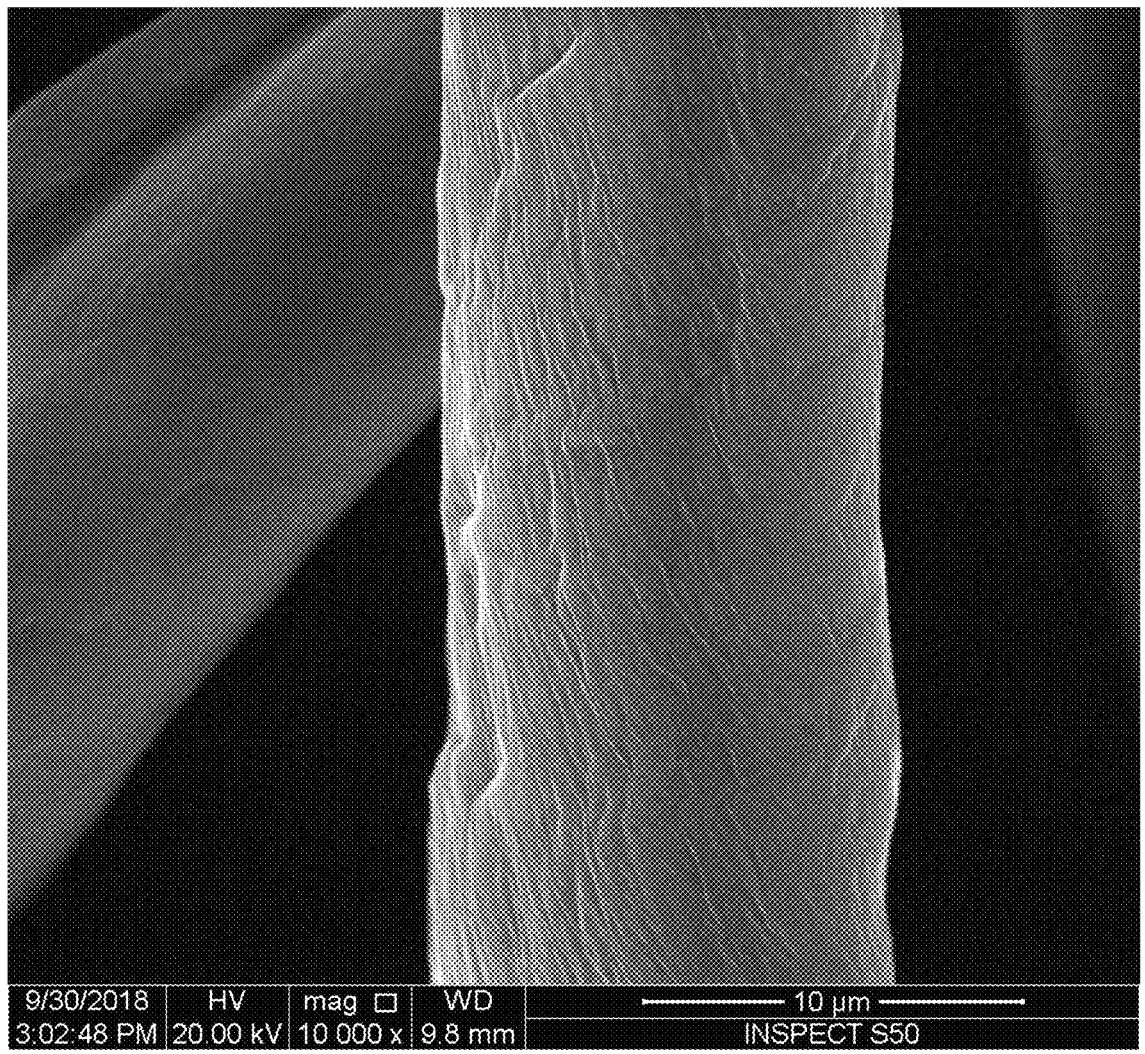
FIG. 3B shows another SEM image of an untreated cotton textile.
Figure 4A:
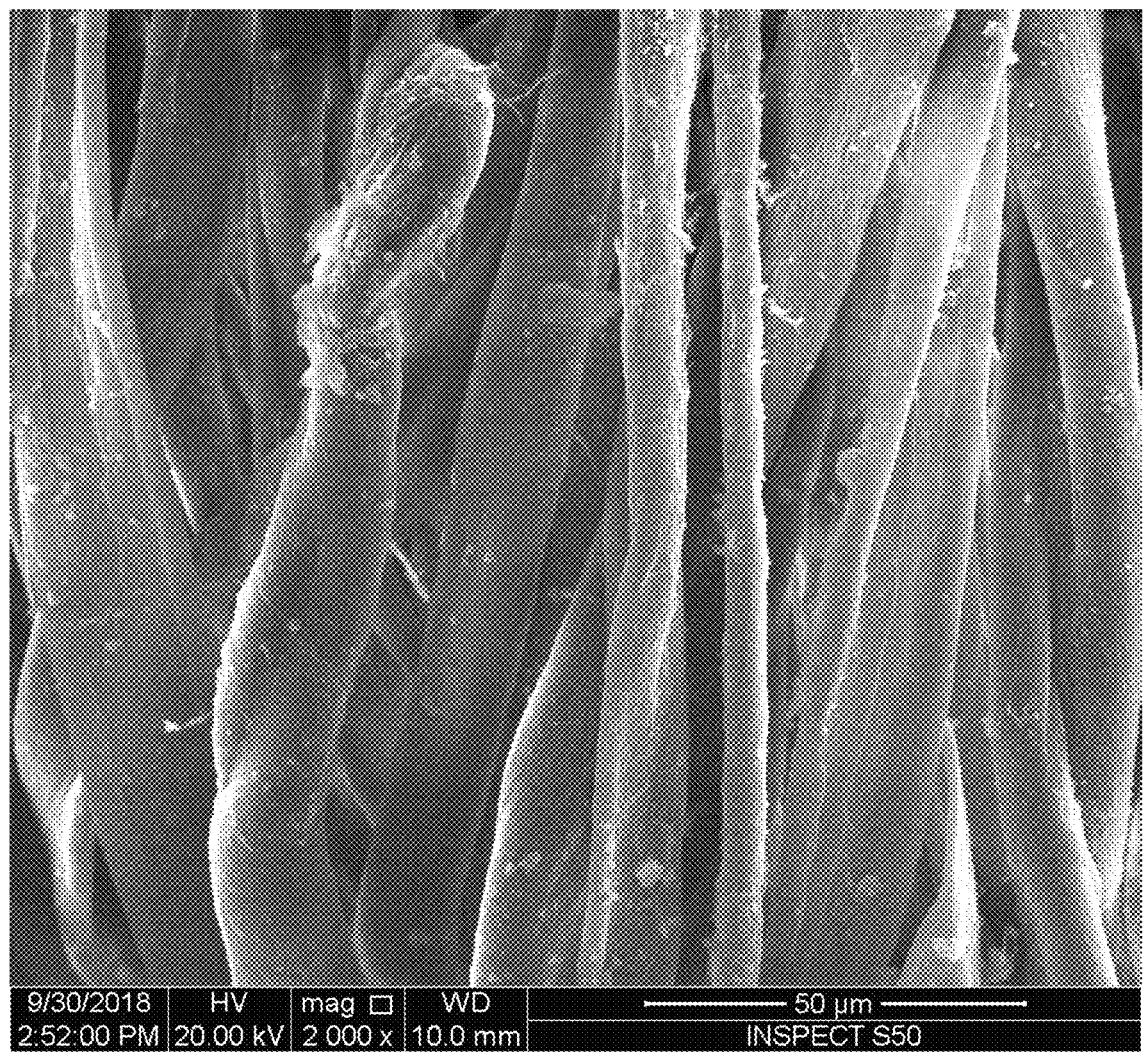
FIG. 4A shows an SEM image of an antimicrobial textile treated with a solution of 10 ppm $TiO_2$.
Figure 4B:
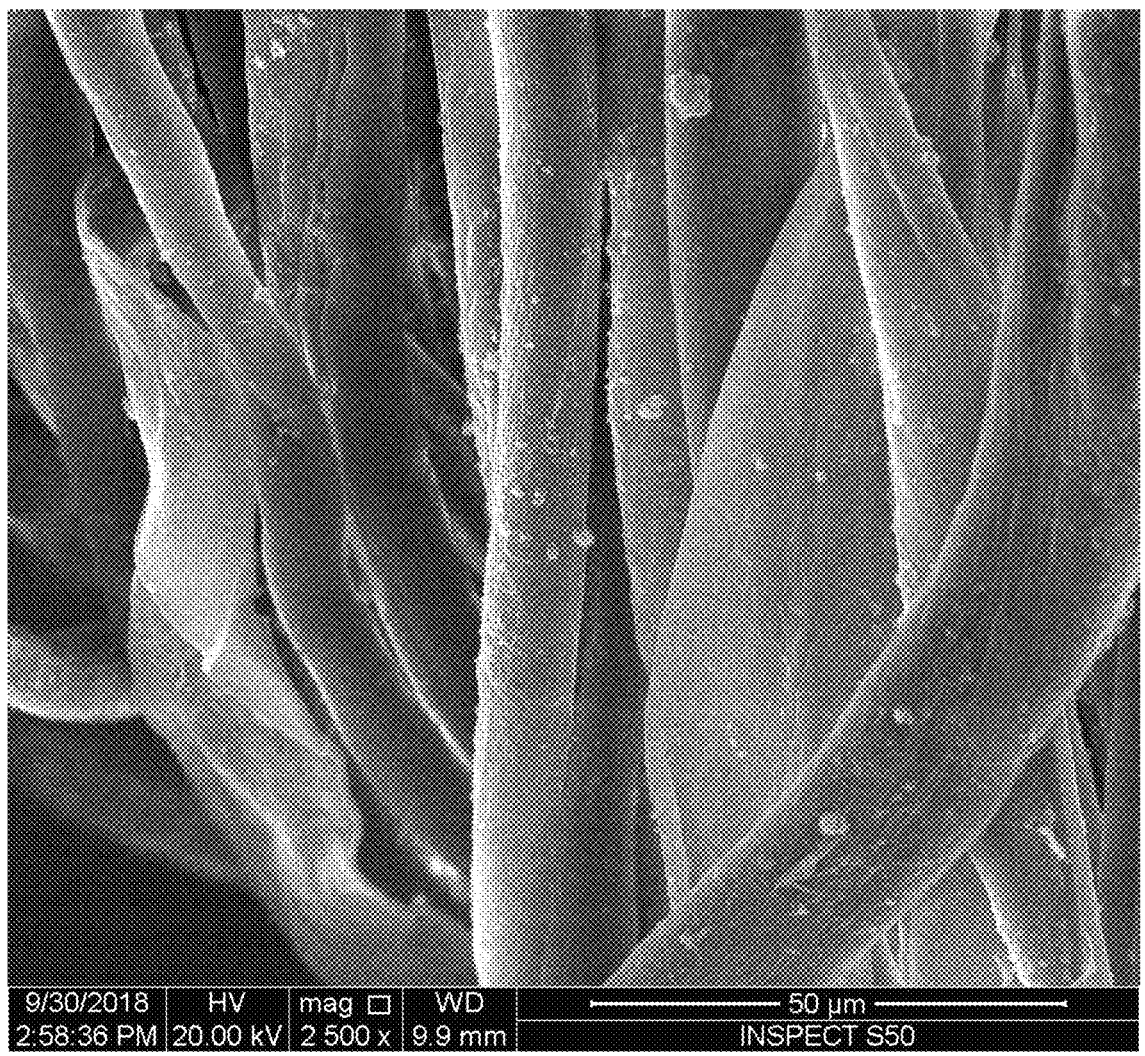
FIG. 4B shows another SEM image of an antimicrobial textile treated with a solution of 10 ppm $TiO_2$.
Figure 4C:
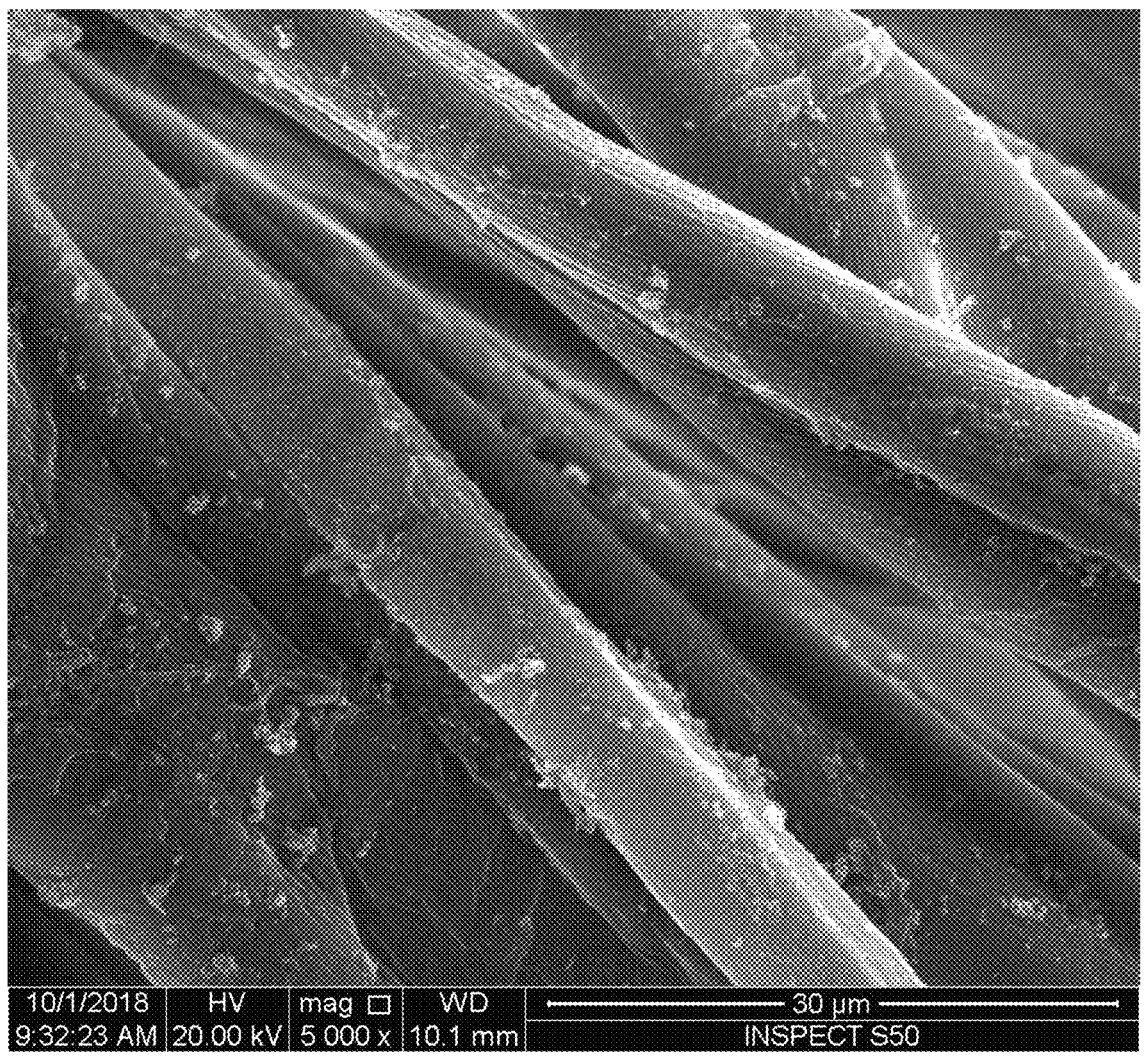
FIG. 4C shows another SEM image of an antimicrobial textile treated with a solution of 10 ppm $TiO_2$.
Figure 4D:
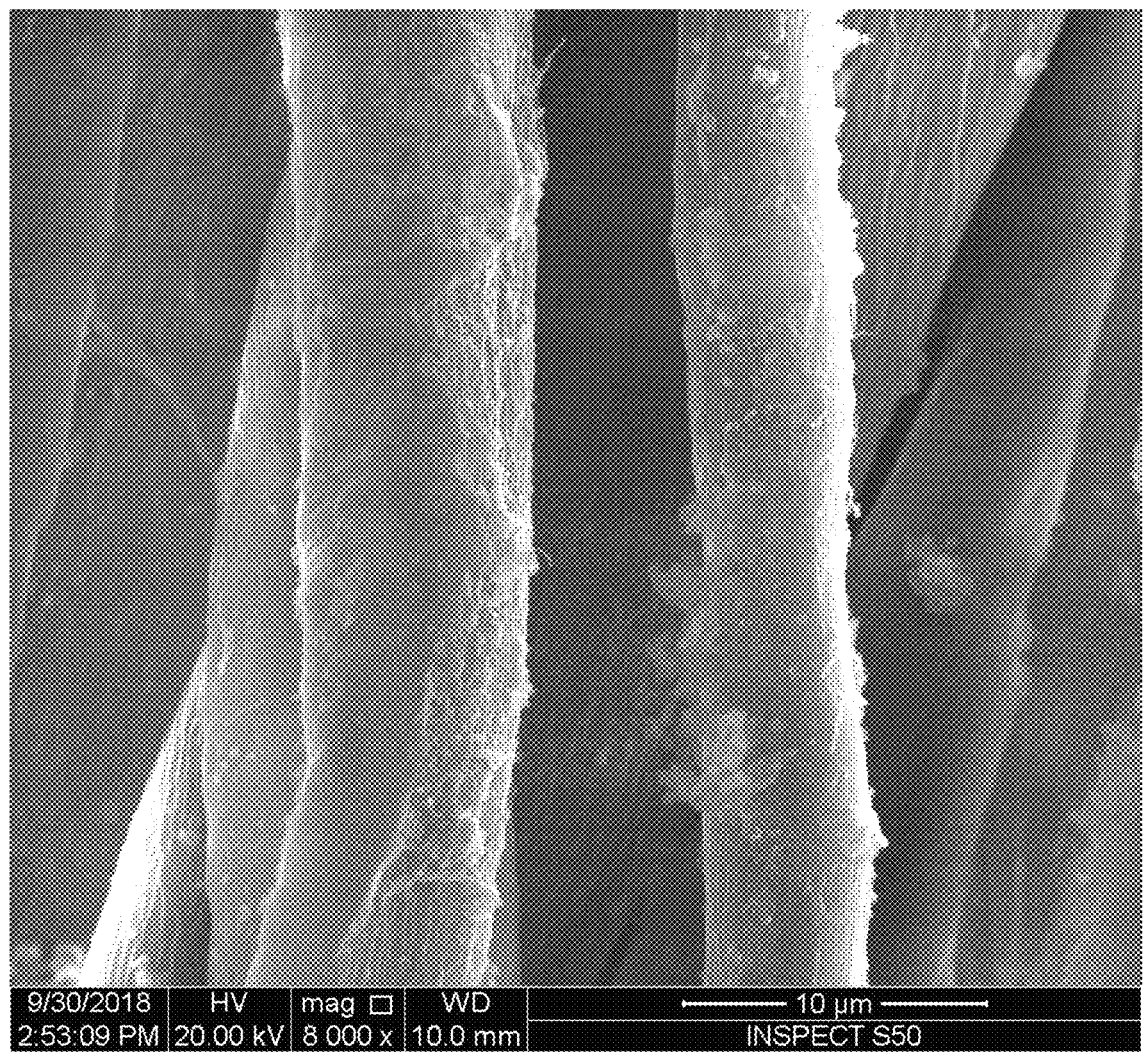
FIG. 4D shows another SEM image of an antimicrobial textile treated with a solution of 10 ppm $TiO_2$.
Figure 5A:
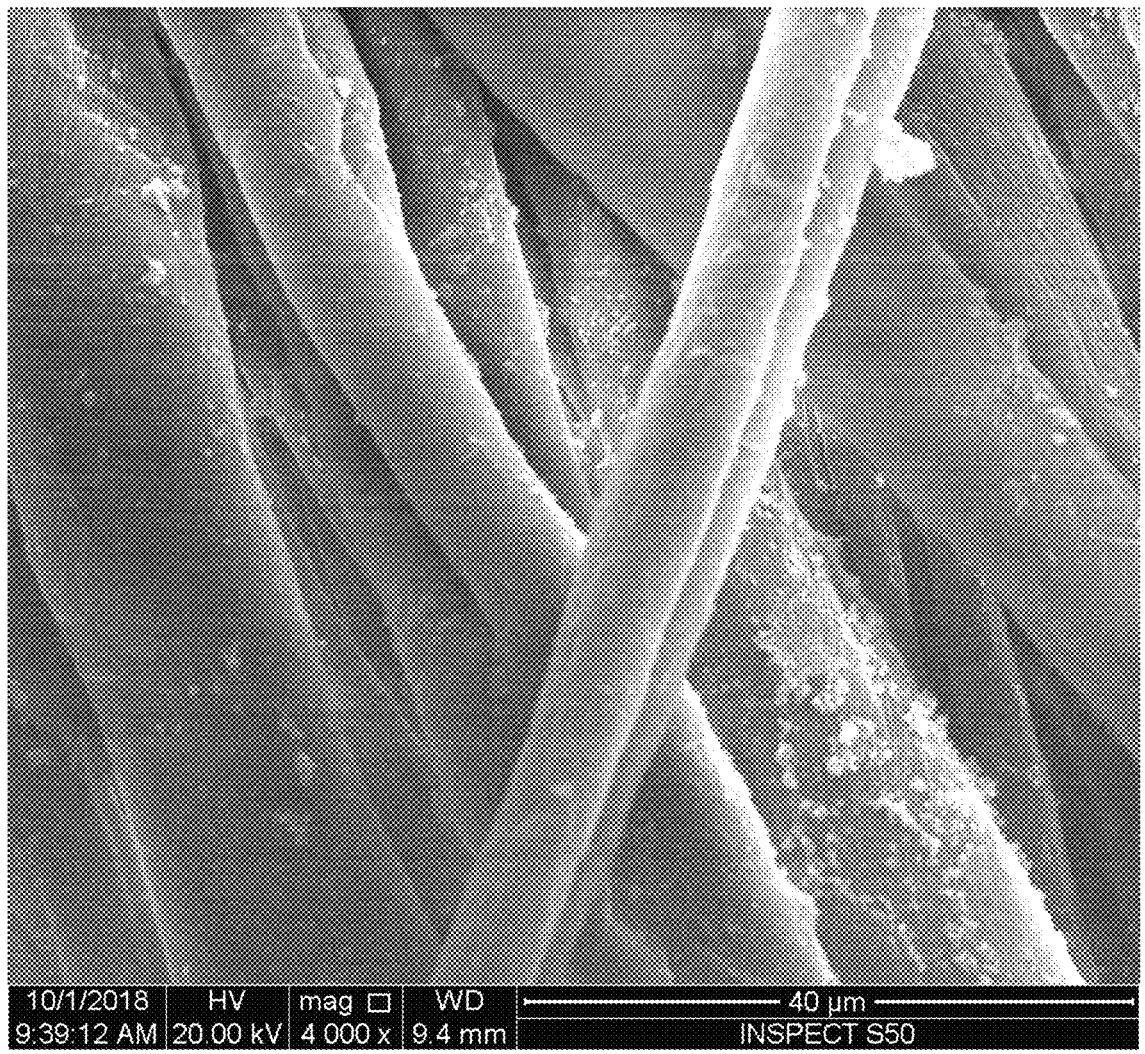
FIG. 5A shows an SEM image of an antimicrobial textile treated with a solution of 30 ppm $TiO_2$.
Figure 5B:
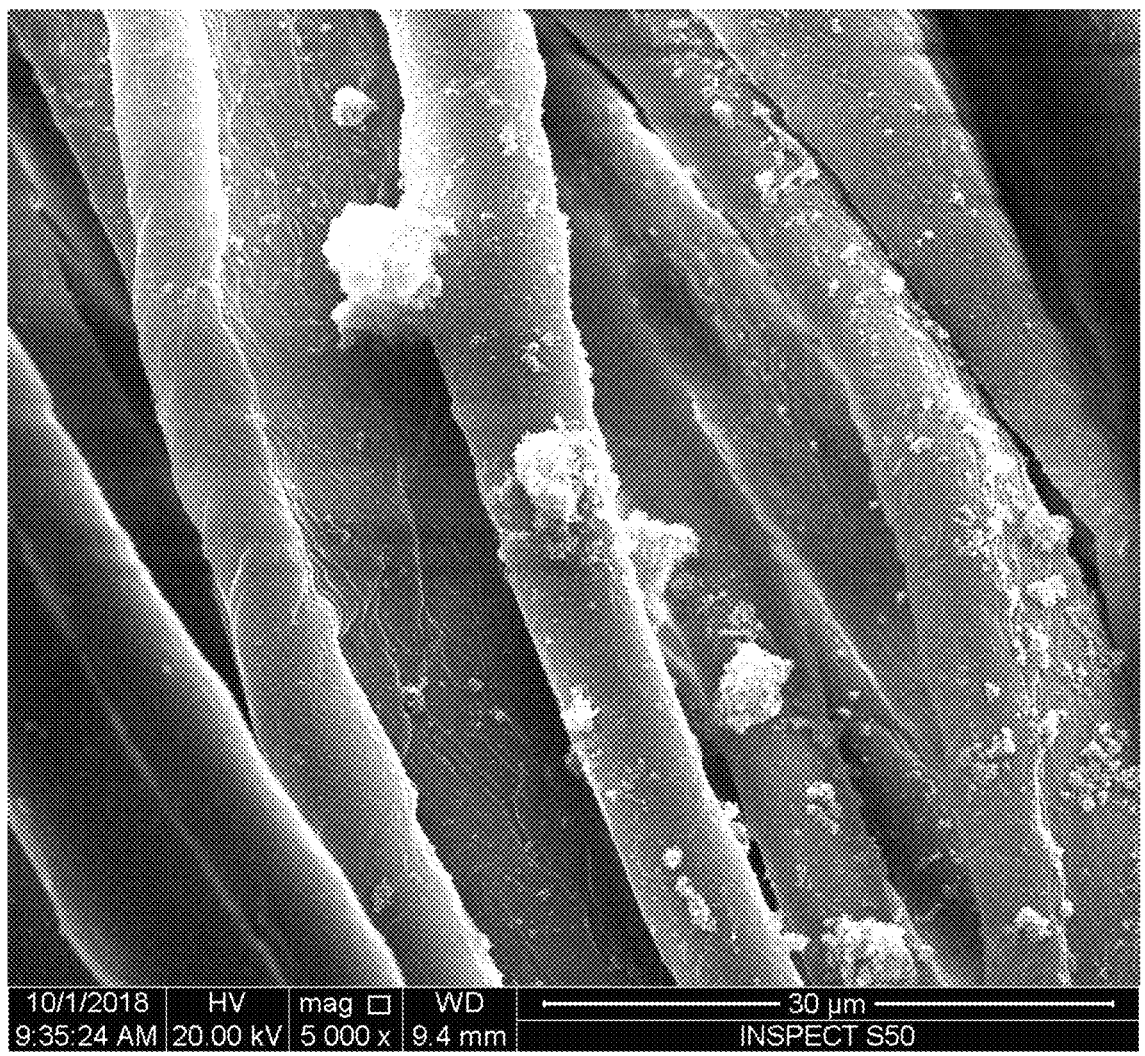
FIG. 5B shows another SEM image of an antimicrobial textile treated with a solution of 30 ppm $TiO_2$.
Figure 6A:
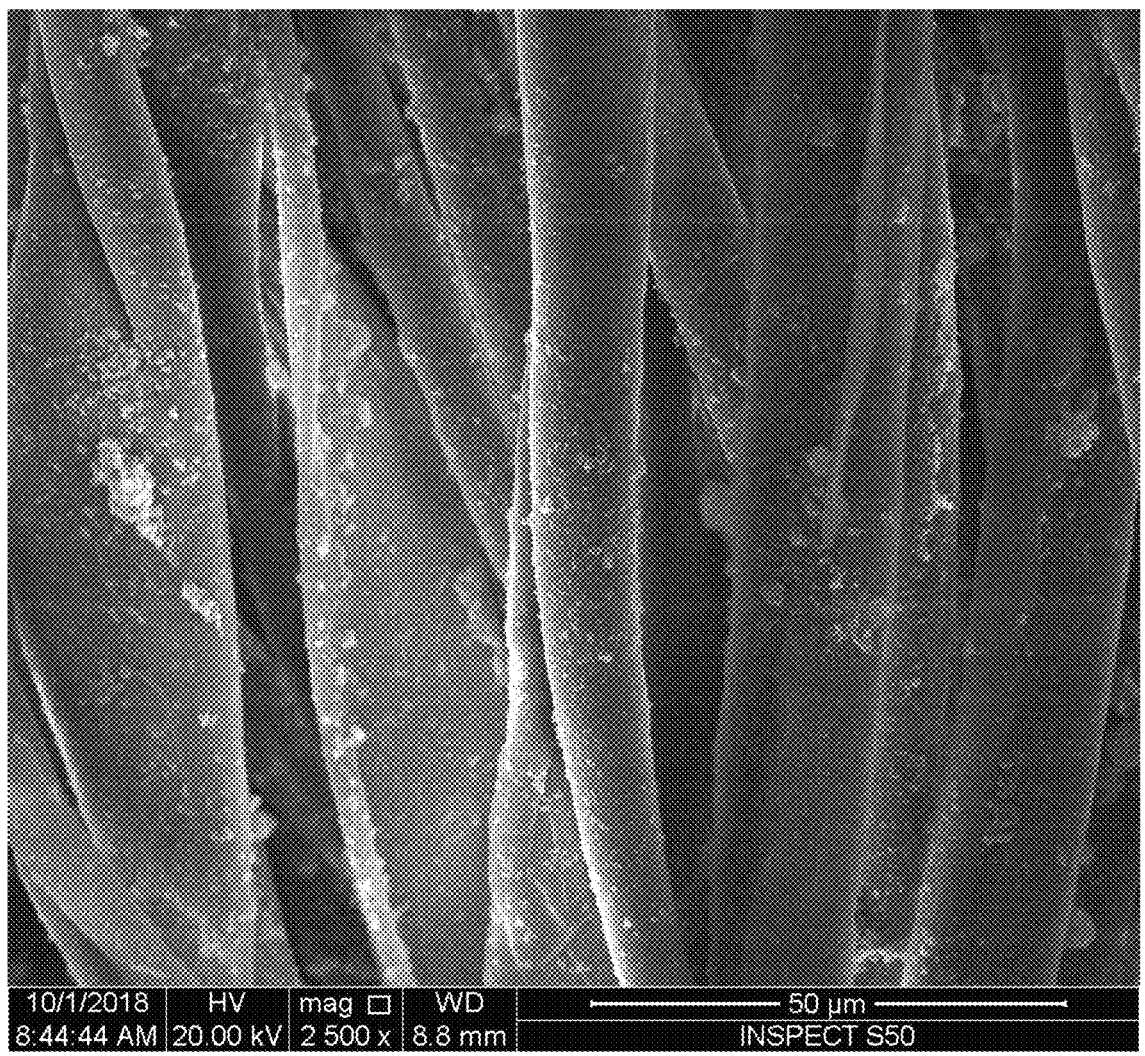
FIG. 6A shows an SEM image of an antimicrobial textile treated with a solution of 50 ppm $TiO_2$.
Figure 6B:
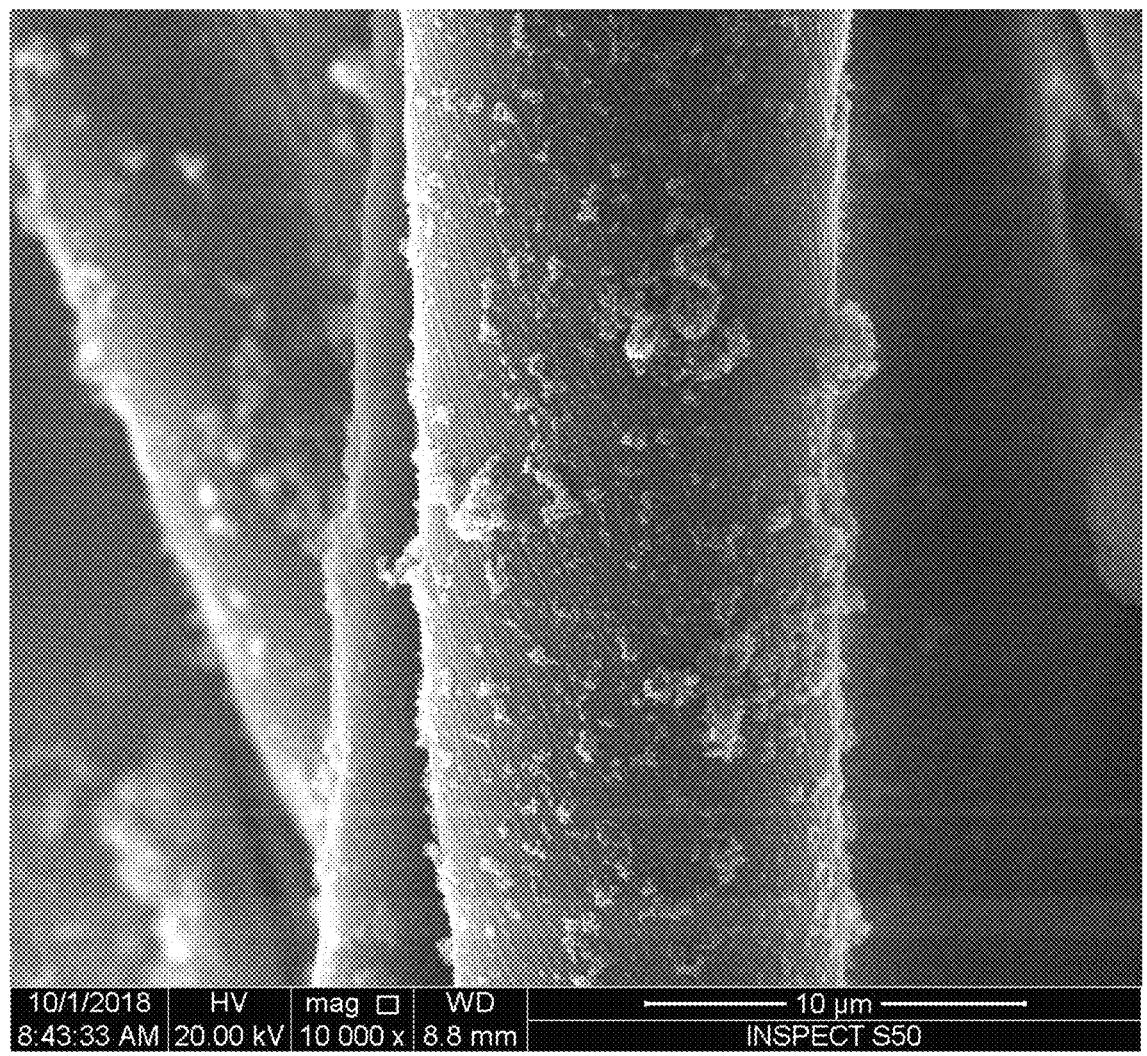
FIG. 6B shows another SEM image of an antimicrobial textile treated with a solution of 50 ppm $TiO_2$.
Figure 6C:
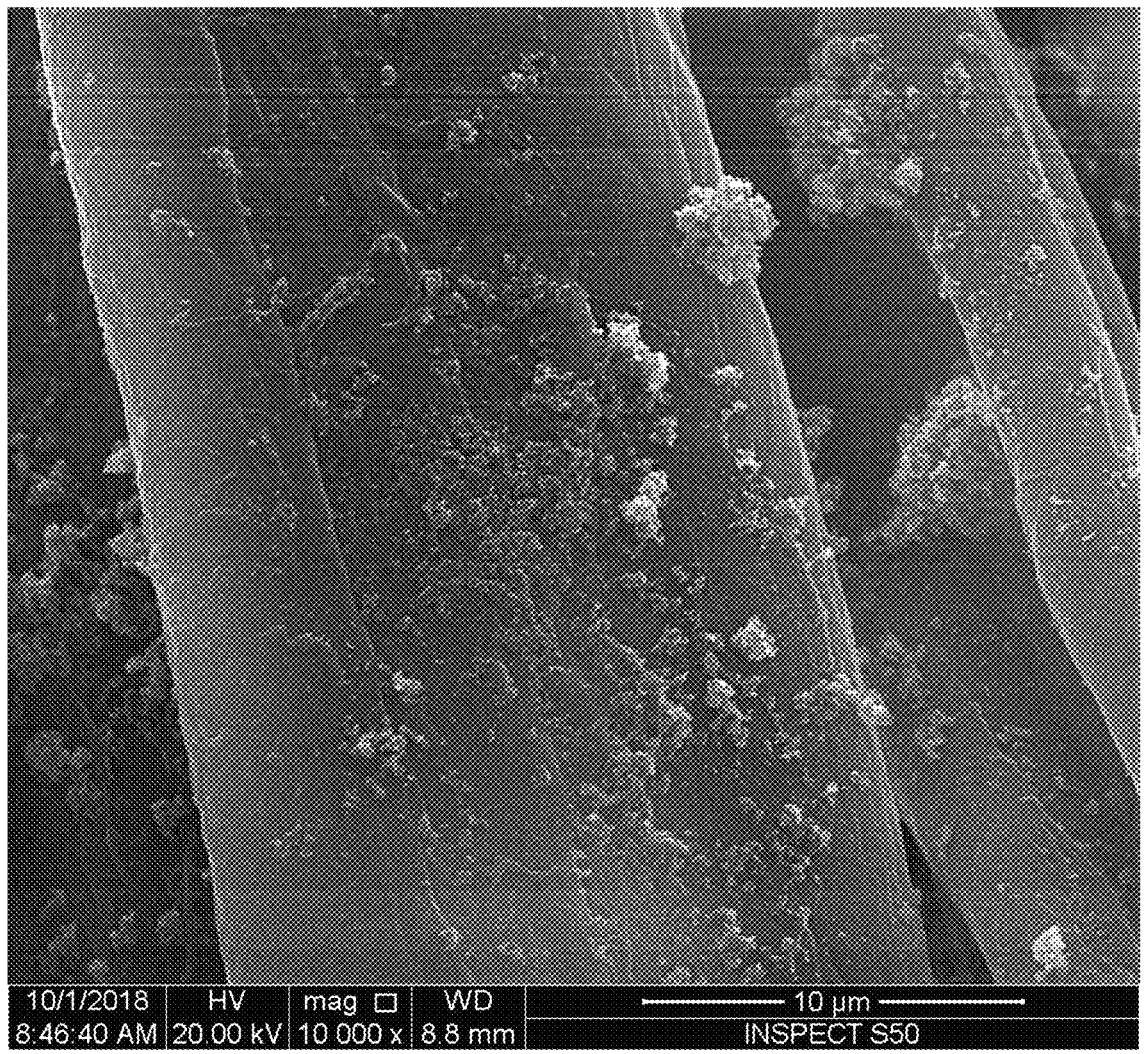
FIG. 6C shows another SEM image of an antimicrobial textile treated with a solution of 50 ppm $TiO_2$.

With increasing concentrations of TiO₂ in the dipping bath, the antimicrobial features of the cotton fabric were enhanced. SEM images of untreated cotton samples are shown in FIG. 3A-3B. SEM images of antimicrobial textiles treated with a solution of 10 ppm TiO₂ are shown in FIGS. 4A-4D. SEM images of antimicrobial textiles treated with a solution of 30 ppm TiO₂ are shown in FIGS. 5A-5B. SEM images of antimicrobial textiles treated with a solution of 50 ppm TiO₂ are shown in FIGS. 5A-5C.

EXAMPLE 3

Experimental Details

Before the nanoparticle treatment, 100% cotton fabrics (purchased from local market) were cleaned with commercial detergent at 100° C. for 15 minutes. The fabrics were then washed with 4 N NaOH (Fisher Scientific, USA) for 30 minutes and then twice rinsed with water at room temperature (35° C.) for 30 min.

The fabrics were then treated with $TiO_2$ nanoparticles (Titanium(IV) Oxide Anatase nanopowder, 99.7% purity, lot #13177E0801, UFC Biotechnology, USA). $TiO_2$ nanoparticle suspensions were made, having concentrations of 10, 30, and 50 ppm in three dipping baths. The dipping baths comprised methanol (Fisher Scientific, USA) and glacial acetic acid (Fisher Scientific, USA) at a volume ratio of 3:1. Each fabric was submerged in the bath for 1 hour, while circulating the bath and maintaining a temperature of 75° C. Then a neutralization step was carried out where the pH was adjusted to a value of 6.8-7.2 using drops of nitric acid. Then the treated cotton fabrics with different concentrations of $TiO_2$ were left to dry at room temperature. Following drying, the treated cotton fabrics were exposed to UV light for 15 minutes while under laminar flow in the lab. Then, the treated cotton fabrics are ready for antimicrobial examination.

EXAMPLE 4

Antimicrobial Examination and Results

Cooked meat broth and blood agar were used as microbiological growth media. Cotton fabrics were sited at the lab center for 8 hours during routine work in microbiology lab. By the end of working day, all treated and non-treated cotton fabrics were cut, inoculated in cooked meat broth, and incubated for 24 hours at 37° C. Then, samples of each were subcultured on blood agar and incubated for 48 hours at 37° C. The growth of organisms from all cotton fabrics was checked and compared.

Figure 2A:
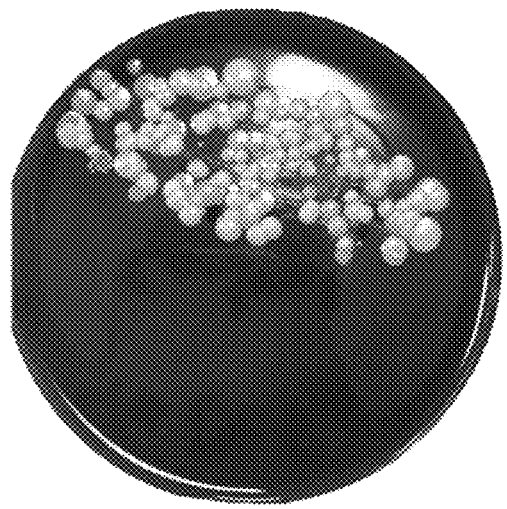
FIG. 2A shows a blood agar plate growth of gram positive bacteria and yeast from an untreated cotton textile.
Figure 2B:
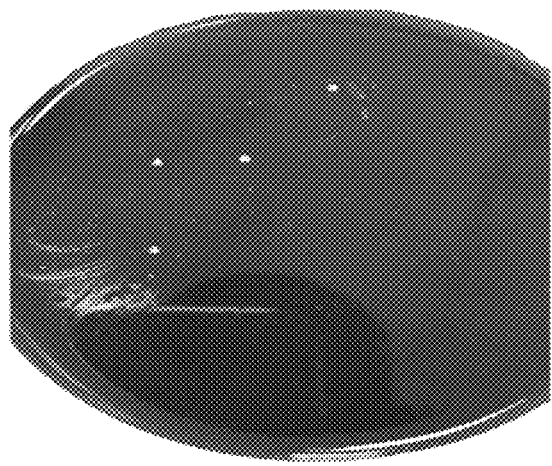
FIG. 2B shows a blood agar plate with reduced growth of gram positive bacteria and yeast from an antimicrobial textile treated with a solution of 10 ppm $TiO_2$.
Figure 2C:
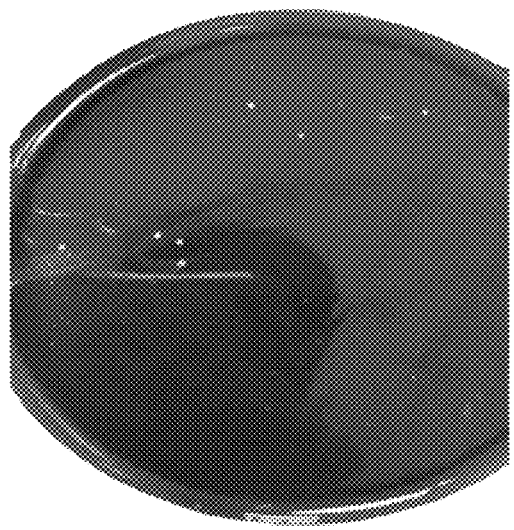
FIG. 2C shows a blood agar plate with further reduced growth of gram positive bacteria and yeast from an antimicrobial textile treated with a solution of 30 ppm $TiO_2$.
Figure 2D:
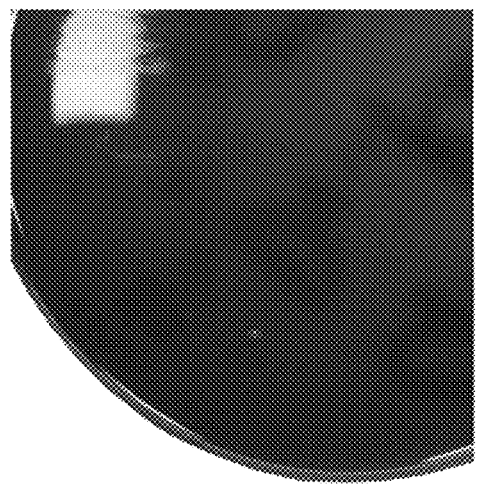
FIG. 2D shows a blood agar plate with no growth of gram positive bacteria and yeast from an antimicrobial textile treated with a solution of 50 ppm $TiO_2$.

Untreated cotton fabric isolated a heavy mixture of organisms including gram positive cocci and yeast, as shown in the blood agar plate in FIG. 2A. However, there was a notable reduction of the isolation of organisms from fabrics treated with titanium dioxide where the levels of humidity, temperature, and air flow exchange were controlled. These samples are indicated in the blood agar plates of FIGS. 2B-2D.

The invention claimed is:

1. A method of making an antimicrobial textile, the method comprising:
   contacting a textile with an inorganic base to produce a treated textile;
   rinsing the treated textile to produce a rinsed textile;
   submerging, in a coating vessel, at a temperature of at least 75° C. for at least one hour, the rinsed textile in a coating composition consisting of $TiO_2$ nanoparticles, methanol, and glacial acetic acid to form a coating mixture containing a coated textile, wherein the coating composition is circulated in the coating vessel during the submerging; and
   neutralizing the coating mixture to a pH of 6.5-7.5 by adding nitric acid to the coating mixture; then
   heating and drying the coated textile at a temperature of 27-50° C.; then
   irradiating the coated textile with a UV light to form the antimicrobial textile, wherein the irradiating forms hydrogen bonds between the $TiO_2$ nanoparticles and surfaces of individual fibrils of the textile,
   wherein the coating composition contains the $TiO_2$ nanoparticles at a concentration of 10-100 ppm by weight, and the $TiO_2$ nanoparticles are anatase $TiO_2$ nanoparticles having an average particle diameter of less than 21 nm; and
   wherein the textile consists of cotton fibers.

2. The method of claim 1, wherein the coating composition contains 60-90 wt % of the glacial acetic acid and 10-40 wt % of the methanol relative to a total weight of the coating composition.

3. The method of claim 1, wherein the textile and the $TiO_2$ nanoparticles are not contacted with a binding agent, and the solution does not comprise a binding agent.

4. The method of claim 1, wherein the antimicrobial textile contains the $TiO_2$ nanoparticles at a weight percentage of 0.01-2.00 wt % relative to a total weight of the antimicrobial textile.

5. The method of claim 1, wherein the textile consists of cotton fiber.

6. The method of claim 1, wherein the antimicrobial textile comprises fibers having a surface area in which 15-40% of the surface area is covered by $TiO_2$ nanoparticles.

7. The method of claim 1, wherein the antimicrobial textile has an antimicrobial activity at least 100 times greater than a second textile that was treated with an essentially identical method that did not have $TiO_2$ nanoparticles, when the antimicrobial textile and the second textile are contacted with similar bacteria and/or fungal cells and a growth medium.

8. The method of claim 7, wherein the antimicrobial activity is at least 1,000 times greater.

9. The method of claim 7, wherein the antimicrobial textile and the second textile are contacted with similar bacteria, which are gram-positive cocci.

10. The method of claim 7, wherein the antimicrobial textile and the second textile are contacted with similar fungal cells, which are yeast cells.

11. The method of claim 1, wherein the antimicrobial textile is a component of a bandage, a cast, a gown, a lab coat, a mask, a shoe covering, a face covering, a curtain, a bedcovering, a carpeting, and/or a head covering.

12. The method of claim 1, wherein the irradiating forms hydrogen bonds directly between hydroxyl groups of cellulose molecules of the cotton and surfaces of the $TiO_2$ nanoparticles.

* * * * *